United States Patent
Suzuki

(12) United States Patent Suzuki

(10) Patent No.: US 7,660,065 B2
(45) Date of Patent: Feb. 9, 2010

(54) DISK POSITIONING INFORMATION WRITING METHOD AND APPARATUS, INFORMATION RECORDING/REPRODUCTION APPARATUS AND RECORDING MEDIUM

(75) Inventor: Nobuyuki Suzuki, Kawasaki (JP)

(73) Assignee: Toshiba Storage Device Corporation, Tokyo (JP)

(*) Notice: Subject to any disclaimer, the term of this patent is extended or adjusted under 35 U.S.C. 154(b) by 156 days.

(21) Appl. No.: 11/339,684

(22) Filed: Jan. 25, 2006

(65) Prior Publication Data

US 2006/0119976 A1    Jun. 8, 2006

Related U.S. Application Data

(63) Continuation of application No. PCT/JP03/09665, filed on Jul. 30, 2003.

(51) Int. Cl.
*G11B 21/02* (2006.01)

(52) U.S. Cl. .......................................... 360/75; 360/48

(58) Field of Classification Search ....................... None
See application file for complete search history.

(56) References Cited

U.S. PATENT DOCUMENTS

| | | | |
|---|---|---|---|
| 6,198,584 B1 | 3/2001 | Codilian | |
| 6,522,488 B2 * | 2/2003 | Sasamoto et al. | 360/31 |
| 6,600,621 B1 | 7/2003 | Yarmchuk | |
| 6,760,172 B1 | 7/2004 | Hamaguchi | |

FOREIGN PATENT DOCUMENTS

| | | |
|---|---|---|
| JP | 3-88181 | 4/1991 |
| JP | 9-91903 | 4/1997 |
| JP | 10-106192 | 4/1998 |
| JP | 2001-14816 | 1/2001 |
| JP | 2001-014818 | 1/2001 |
| JP | 2001-28111 | 1/2001 |

* cited by examiner

*Primary Examiner*—Jason C Olson
(74) *Attorney, Agent, or Firm*—Greer, Burns & Crain, Ltd.

(57) ABSTRACT

When positioning information is previously written in a disk-shaped recording medium, used for positioning a head provided for writing information to the disk-shaped recording medium or reading information written in the disk-shaped recording medium, the positioning information for one track of the disk-shaped recording medium includes, along a path of the one rotation, an overlapping part by which the head can be re-directed to the non-overlapping part if the head is offset from its starting point when it reaches the end of the rotation.

22 Claims, 34 Drawing Sheets

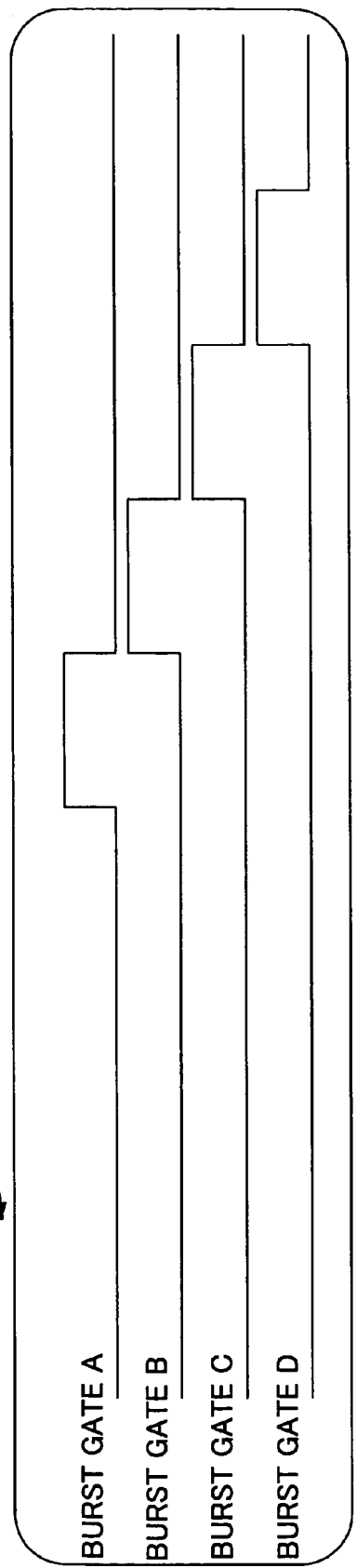

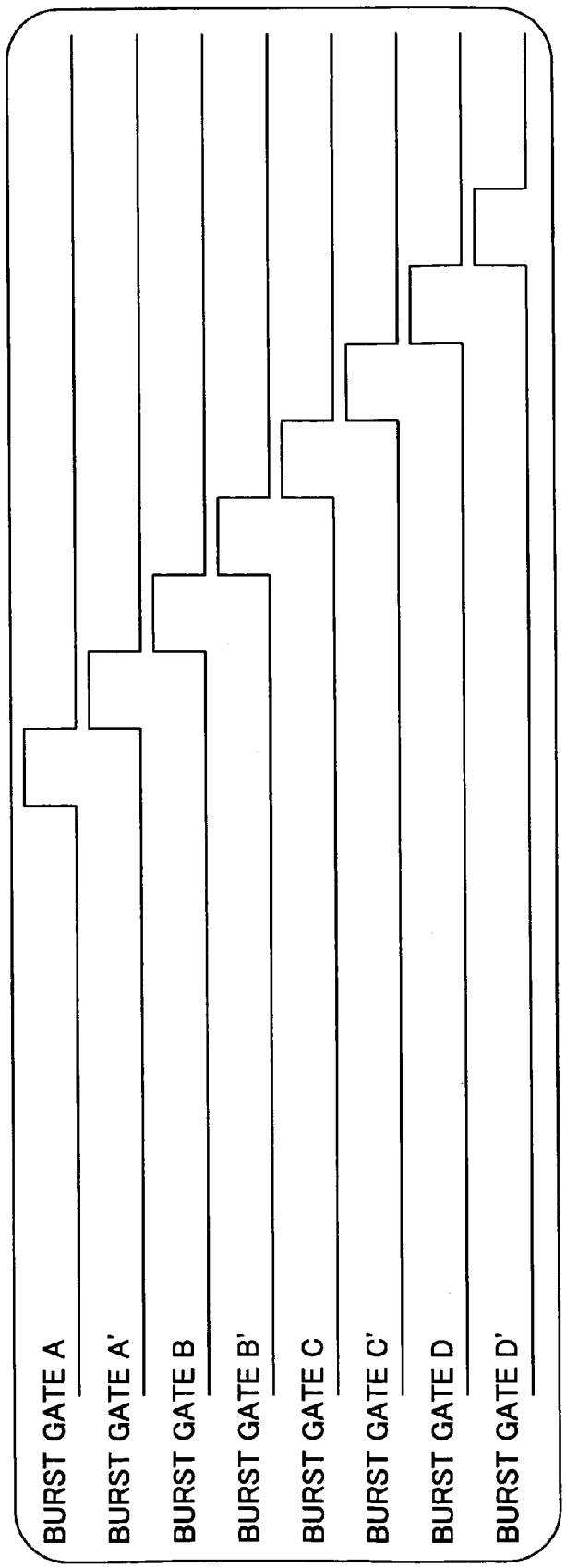

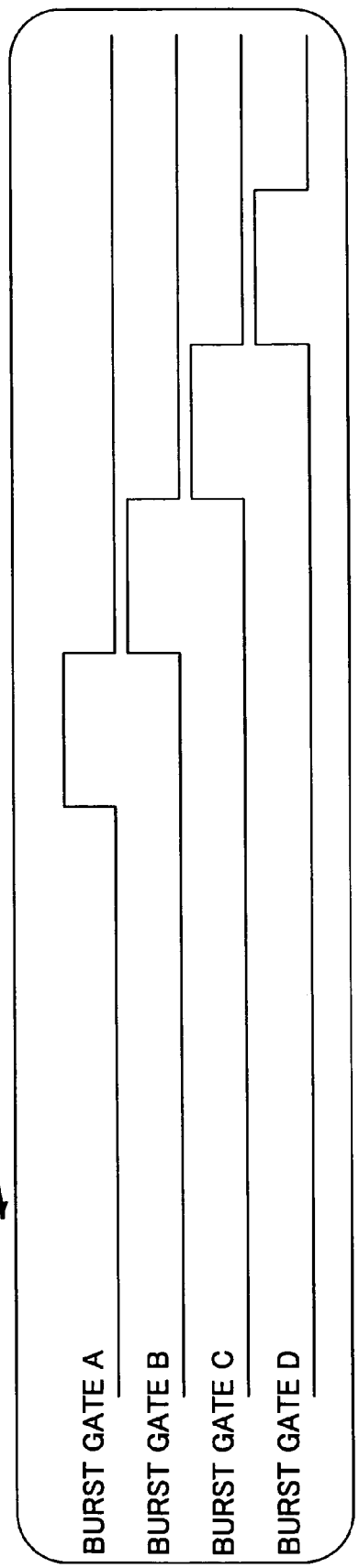

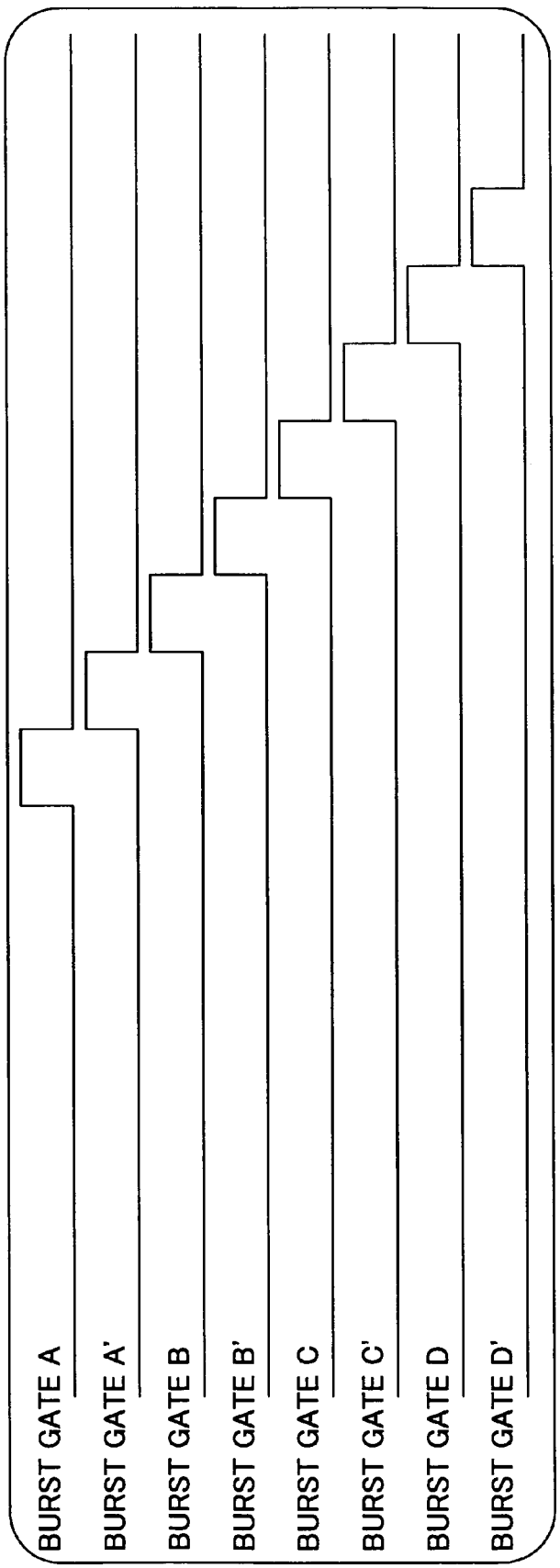

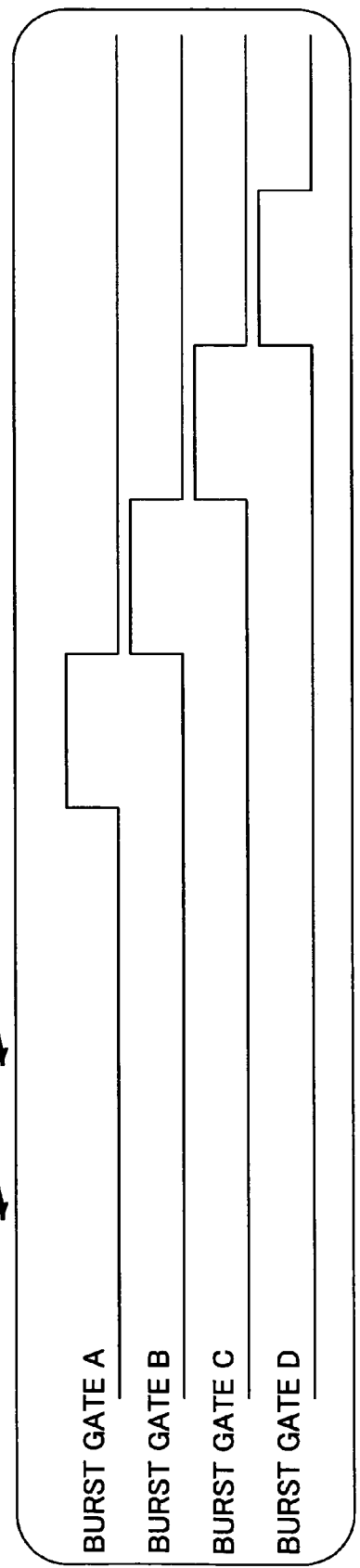

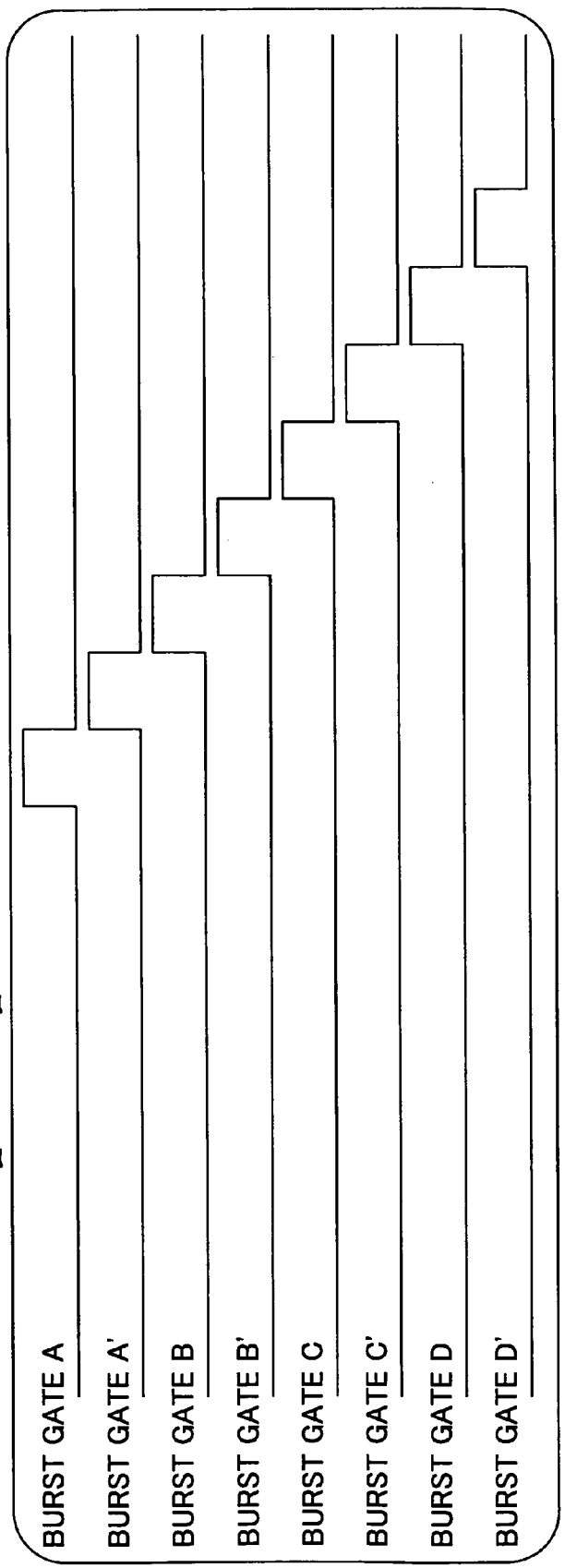

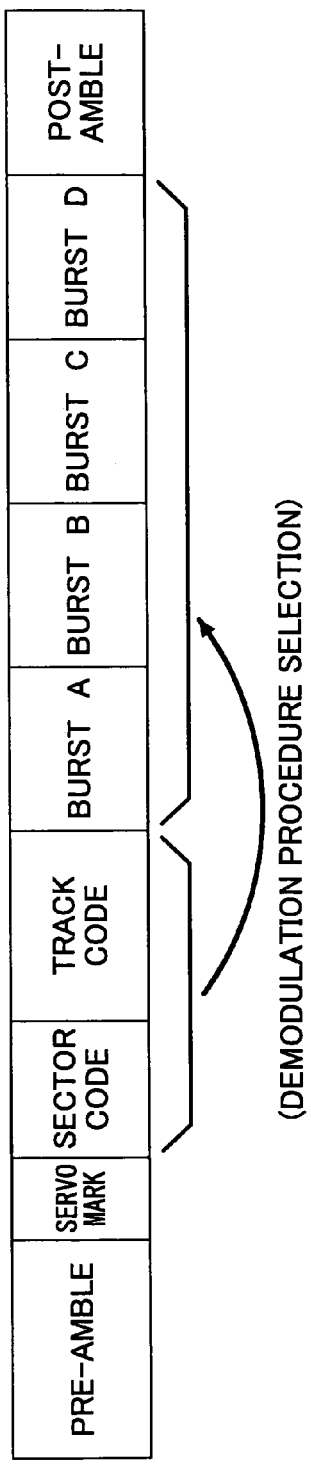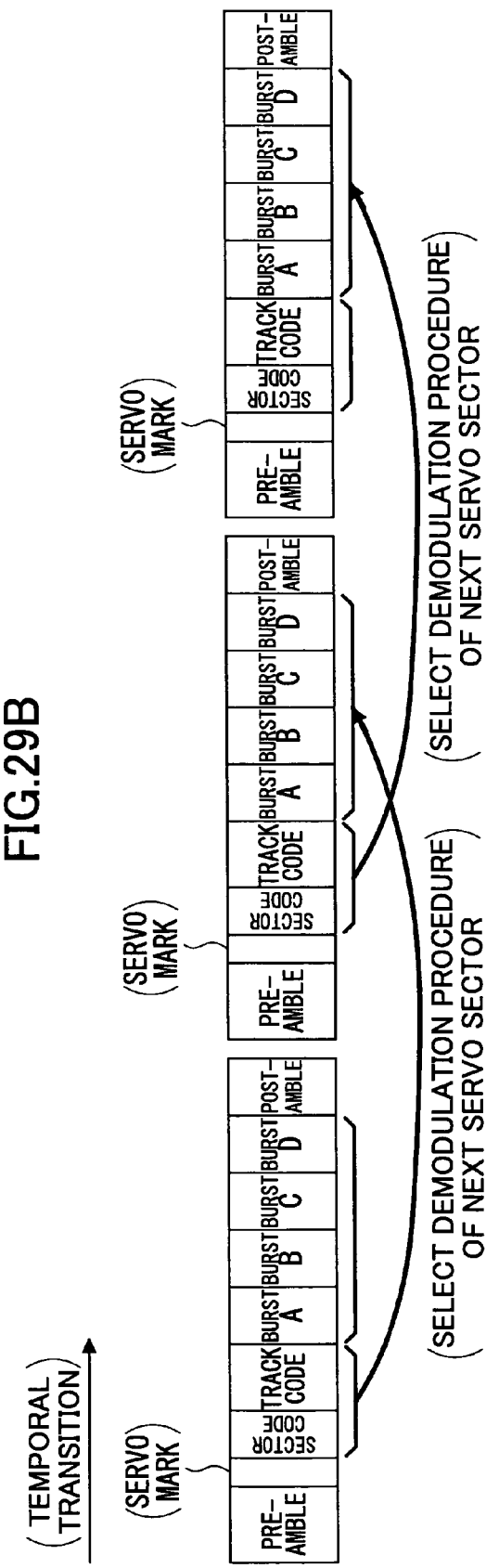

DISK POSITIONING INFORMATION WRITING METHOD AND APPARATUS, INFORMATION RECORDING/REPRODUCTION APPARATUS AND RECORDING MEDIUM

CROSS-REFERENCE TO RELATED APPLICATION

This application is a U.S. continuation application filed under 35 USC 111(a) claiming benefit under 35 USC 120 and 365(c) of PCT application JP03/09665, filed Jul. 30, 2003. The foregoing application is hereby incorporated herein by reference.

BACKGROUND OF THE INVENTION

1. Field of the Invention

The present invention relates to disk positioning information writing methods and apparatus, an information recording/reproduction apparatus and a recording medium, and, in particular, to a disk positioning information writing method and apparatus by which even when a positional error of disk positioning information occurs due to so-called asynchronous vibration (NRRO; i.e., non-repeatable runout) in a disk positioning information writing apparatus such as a servo track writer, a positioning error upon recording/reproduction on a disk can be effectively avoided; an information recording/reproduction apparatus carrying out information recording/reproduction on the thus-obtained disk; and a recording medium which is the disk.

2. Description of the Related Art

A 'servo track' previously written on a magnetic disk for the purpose of carrying out positioning control of a recording/reproduction head in a magnetic disk apparatus is used to provide disk positioning information.

In the magnetic disk apparatus, positioning of the recording/reproduction head is carried out with the use of the servo track previously written in the magnetic disk as mentioned above. Known servo control methods may be classified into the following two types in terms of a position detecting method from a servo pattern (a servo burst or such) written as the positioning information on the disk.

A first method applies a burst pattern. In this method, the precise position of a head is detected as a result of amplitudes of two sets of burst patterns having phases different by 90°, i.e., four sets of burst patterns being calculated. This method also includes a method in which the number of bursts forming the burst patterns is three phases, six phases, or such, other than the above-mentioned four phases. A second method is to apply a phase pattern. In this method, previously recorded patterns are disposed in such a manner that, along with movement of a head in a track direction, a phase between a reference signal and a position detection signal may linearly shift. Then, by reading this, a detailed position of a head is detected.

As a device to write a servo pattern such as that mentioned above to a disk-shaped medium such as a magnetic disk, a so-called 'servo track writer' is known. FIG. 1 shows one example of a common servo track writer. The servo track writer includes a spindle motor having a hard disk drive 100 as a product loaded therein, supporting the same and rotating the same; a clock head 360 previously writing predetermined clock information in a disk-shaped medium 110. The servo track writer reads the clock information therefrom when writing a servo track, and transmitting the same to a servo pattern generator 350. A writing head 130 writes the servo track to the medium; an actuator arm assembly 140 rotateably support the writing head 130; a laser measurement system 320 measures a position of the actuator arm assembly; a positioning controller 340 carries out positioning control of the actuator arm assembly on the side of the hard disk drive via an actuator 330 on the side of the track writer based on position information sent from the laser measurement system; a spindle motor controller 310 controls driving of the spindle motor; and a servo pattern generator 350 generates a servo information pattern to be written in the disk-shaped medium 110 while controlling timing based on the clock information sent from the clock head 360.

In the servo track writer configured above, writing of a servo track is repeated with each rotation of the medium while the writing head is positioned according to a predetermined feeding pitch. This operation is repeated until all the tracks are written.

In this method, the writing head is accurately positioned with respect to the laser measurement system. However, relative positioning with respect to the medium to which the servo track is written is not carried out. Further, a route of a single servo track is determined by the route covered in one pass of servo track writing. Therefore, if NRRO of the spindle motor, an error in positioning of the write head or such occurs, the thus-written servo track does not form a complete concentric circle, and a step occurs in the servo track at the joint part between a writing start and a writing end. When this step is large, a recording/reproduction head cannot stably follow the track in the above-mentioned servo control, and various problems may occur.

In order to solve this problem, Patent Document 1, described later, discloses a method, for example. In this method, a plurality of phases of bursts are written along the direction of the track over a plurality of rotations over that track. As a result of an individual servo track being written over a plurality of rotations, the amount of error occurring due to NRRO from the spindle motor can be averaged over.

Patent Document 2 discloses a method in which a frequency and a phase of NRRO of a spindle motor are measured, and a servo track is written only when a difference in NRRO between a writing start and a writing end is within an acceptable limit.

Patent Document 1:
Japanese Laid-open Patent Application No. 2001-14816
Patent Document 2:
Japanese Laid-open Patent Application No. 2001-14818
Patent Document 3:
Japanese Laid-open Patent Application No. 10-106192
Patent Document 4:
Japanese Laid-open Patent Application No. 2001-28111

However, when a method as disclosed by Patent Document 1 in which one individual servo track is written over multiple rotations, the time required for writing each servo track is multiplied by the number of the above-mentioned plurality of rotations. As a result, the time required for writing the servo tracks increases remarkably.

In the method of Patent Document 2, although it is not necessary to write a servo track over multiple rotations for each track, as in the method of Patent Document 1, a servo track cannot be written during an acceptable time frame if there is a large amount of NRRO of the spindle motor from the above-mentioned measurement. Therefore, a waiting time occurs, and thus, the time required for writing all the tracks remarkably increases.

SUMMARY OF THE INVENTION

According to the present invention, in order to solve the above-mentioned problem, a dividing write method of writing over multiple rotations is applied for a predetermined part of one rotation of each servo track, while a writing method of writing in a single rotation according to the prior art is applied for the other part. That is, after one rotation of a particular servo track is written on a disk-shaped recording medium, writing during another rotation over the same track is carried out, but only over a predetermined angle.

A problem of the prior art occurring from shaft runout such as NRRO of a spindle motor of a servo track writer upon servo track writing mainly occurs from a step occurring at a joint part between a part of writing start and a part of writing end in one rotation of servo track writing. An example of a "step" is shown in FIG. 2; i.e., the discrepancy between $Q_1$ and $Q_2$. According to the present invention, overlapped writing is carried out for a limited part in the vicinity of the joint part at which the step occurs.

For the above-mentioned multiple writing part, a positional error is obtained from an average of detected positions obtained from patterns written in the respective rotations upon servo pattern detection at a time of servo control. As a result, a magnitude of the step occurring at the joint part can be substantially reduced. As a result, servo control can be effectively stabilized. Further, in this method, since the multiple writing is carried out only for the limited section in the vicinity of the joint part, the time required therefor is limited, and thus, a rate of time increase with respect to the disk manufacturing process can be minimized.

BRIEF DESCRIPTION OF THE DRAWINGS

Other objects and further features of the present invention will become more apparent from the following detailed description when read in conjunction with the accompanying drawings:

FIGS. 18A, 18B, 18C and 18D illustrate a servo demodulation method according to one embodiment of the present invention.

FIGS. 20A, 20B, 20C and 20D illustrate a servo demodulation method according to another embodiment of the present invention.

FIGS. 22A, 22B, 22C and 22D illustrate a servo demodulation method according to yet another embodiment of the present invention.

FIGS. 24A, 24B, 24C and 24D illustrate a servo demodulation method according to still another embodiment of the present invention.

FIGS. 29A and 29B illustrate an arrangement example of servo sectors when the above-mentioned embodiment is applied.

DESCRIPTION OF THE PREFERRED EMBODIMENTS

Figure 1:
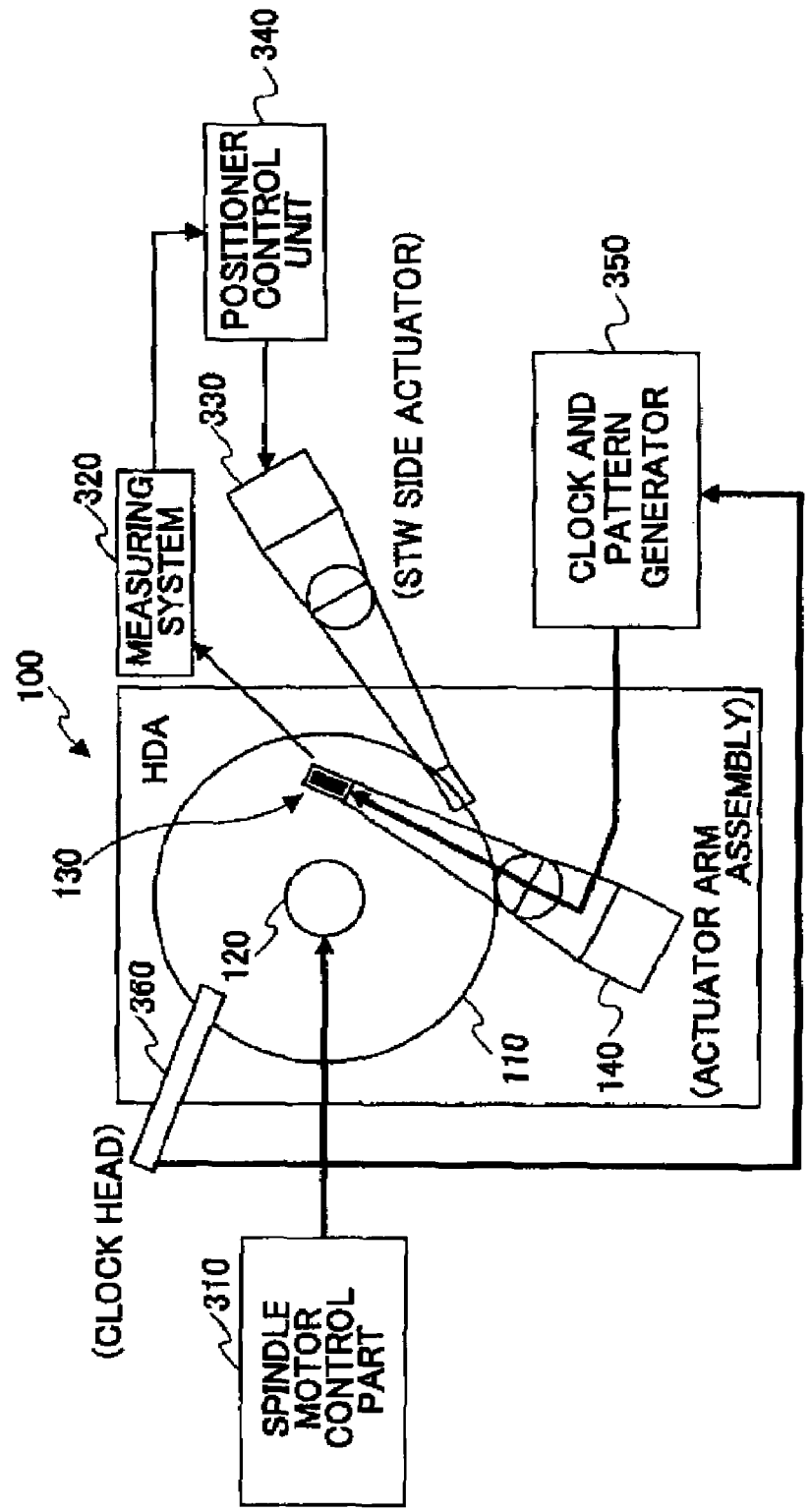
FIG. 1 shows a general configuration of a common track writer to which the present invention is applicable.

With reference to figures, embodiments of the present invention are described in detail.

First, a principle of the present invention will be described. When servo tracks as recording/reproduction positional information for a disk-shaped recording medium are written to this medium by means of a servo track writer before a shipment of this medium from a factory, a so-called dividing write method described later is applied for sectors at a part of a writing start and a writing end of one round of the servo track. That is, when a servo track is written around the circumference of one track, the writing start part and the writing end part are overlapped, with the dividing write method being applied to the overlapping part. In this manner, a complete servo track is produced. For the purpose of easier understanding, this method is also called an 'overlap width' method.

Thus, for writing start and writing end parts at which a step occurs at a joint part where the overlapped part begins due to NRRO of a spindle motor of a servo track writer, writing over multiple rotations is carried out, but only over a partial rotation. Only in this partial rotation section is the dividing write method applied. As a result, one servo track thus written has its overlapped part written in the multiple manner, in that there are two servo tracks offset by some distance due to NRRO. When servo information of the overlapped section is averaged during servo control reading, the step of the joint part can be made substantially inconspicuous because the head can be smoothly adjusted over the joint to track correctly. As a result, stable tracking servo control can be achieved in the information recording/reproduction apparatus.

Further, in embodiments of the present invention, when the above-mentioned multiple rotation part ('overlap width' part) of a servo track is written by the servo track writer, the magnitudes of the two servo patterns produced in the overlapping region should preferably be gradually changed. That is, when a recording/reproduction head follows a lap around a servo track, the head should transfer from one track path to another track path when the step exists at the joint part. In this case, writing should be made in such a manner that, by gradually changing the magnitude of the servo patterns as mentioned above, the magnitude of the second servo pattern in the overlapping part gradually decreases while the recording/reproduction head follows the servo track, and, on the other hand, the magnitude of the servo pattern of the servo track first written in the overlapping portion, to which the head should transfer, gradually increases. As a result, transferring of the head at the overlapping part can be smoothly carried out, and thus, more stable servo tracking can be achieved.

By such a configuration, when a servo track is written, the influence of a step of the servo track caused by NRRO of a spindle motor or such can be controlled to be substantially small. Also, since the above-mentioned multiple part only covers an angular part of the servo track, the increase in writing time can be controlled to a minimum. As a result, positioning accuracy improves, and a highly reliable magnetic disk apparatus can be achieved.

Details of respective embodiments of the present invention are described with reference to figures.

In order to make clear differences from the prior art, the prior art is described first for the purpose of comparison.

Figure 2:
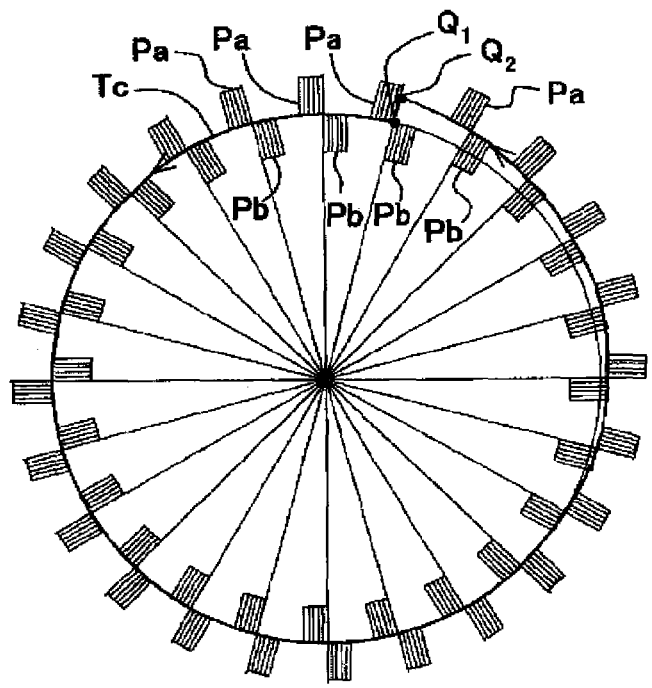
FIG. 2 illustrates a step occurring upon servo track writing in one example of the prior art.

FIG. 2 shows a common manner of servo track writing. There, servo track writing is carried out counterclockwise, writing is started from a point Q1 and is ended at a point Q2. The servo track writing is carried out actually with burst patterns Pa and Pb of a magnetic signal. It has been mentioned above that writing is made counterclockwise. However, as well known, actually, the disk-shaped recording medium itself turns. Accordingly, actually, the disk-shaped recording medium turns clockwise, and thus, a writing head relatively moves counterclockwise on the disk-shaped recording medium. The same manner is also applied hereinafter.

Figure 4A:
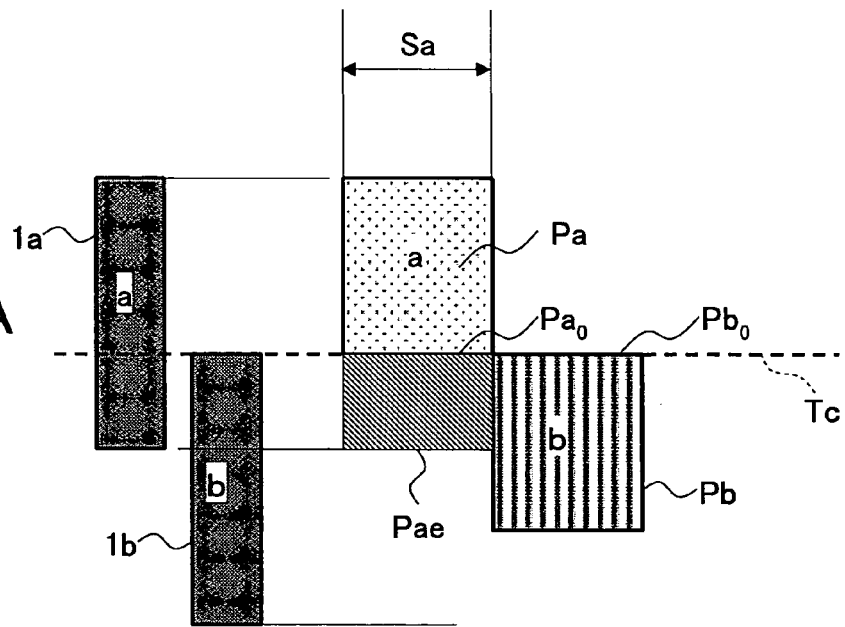
FIGS. 4A and 4B illustrate one example of a method of writing a test pattern included in a servo track.
Figure 4B:
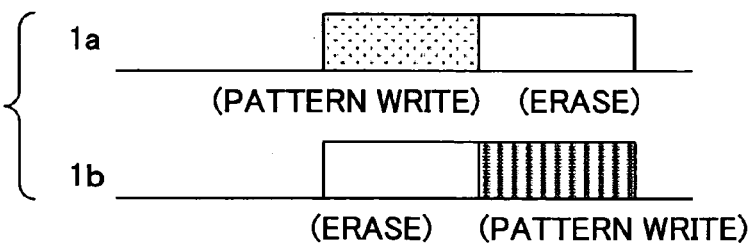

FIG. 4A shows a manner of writing with writing heads 1a and 1b. That is, first, a burst pattern Pa on the right side in a moving direction is written by the writing head 1a. After that, a left burst pattern is written by the writing head 1b. At this time, as shown in FIG. 4B, the pattern Pa is written by the head 1a, after that the pattern Pb is written by the head 1b, and after that, by the same head 1b, Pae which is a left side part of the pattern Pa is erased. A right edge Pbo of the pattern Pb and a left edge Pao of the pattern Pa, thus provided, form a track center Tc.

Returning to FIG. 2, in a servo track thus written as a result of the burst patterns being written in sequence, a writing start track center point Q1 and a writing end track center point Q2 may not agree with one another as a result of a rotational axis of the disk-shaped recording medium may shift, as shown in FIG. 2, due to NRRO of a spindle motor of a servo track writer, as described above. That is, the servo track thus written may not be an accurate concentric circle, and therefore, a step occurs at the joint part between a writing start and a writing end.

Figure 3:
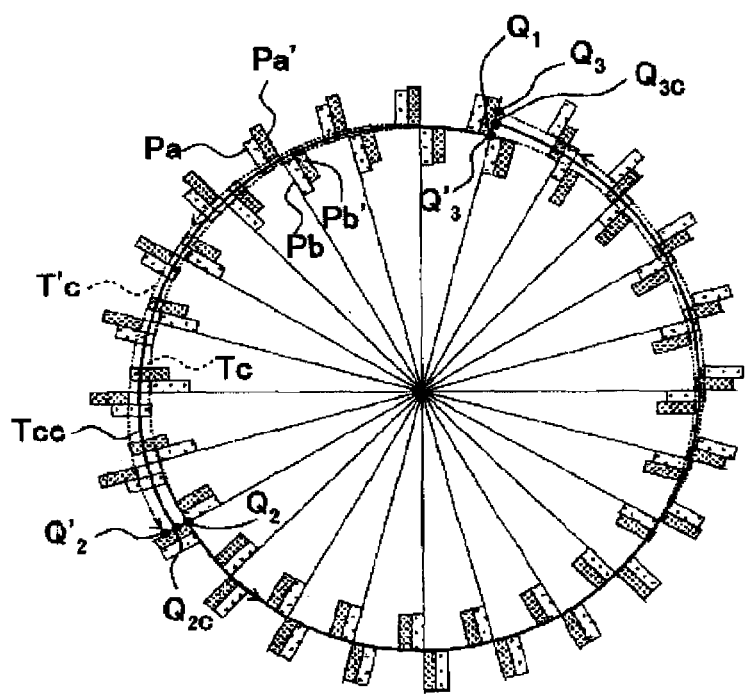
FIG. 3 illustrates one example of a method for avoiding an adverse effect of the above-mentioned step.

FIG. 3 shows a method for solving this problem. In this case, writing is made a plurality of times over the same track. In this case, since shifts of a track center caused by shaft runout such as NRRO become random over the plurality of times of writing generally speaking, directions of the shaft runout become random. Accordingly, by carrying out servo tracking by detecting over multiple rotations the average of the track centers of writing, any influence of the step occurring due to the above-mentioned shaft runout can be effectively reduced.

Figure 5A:
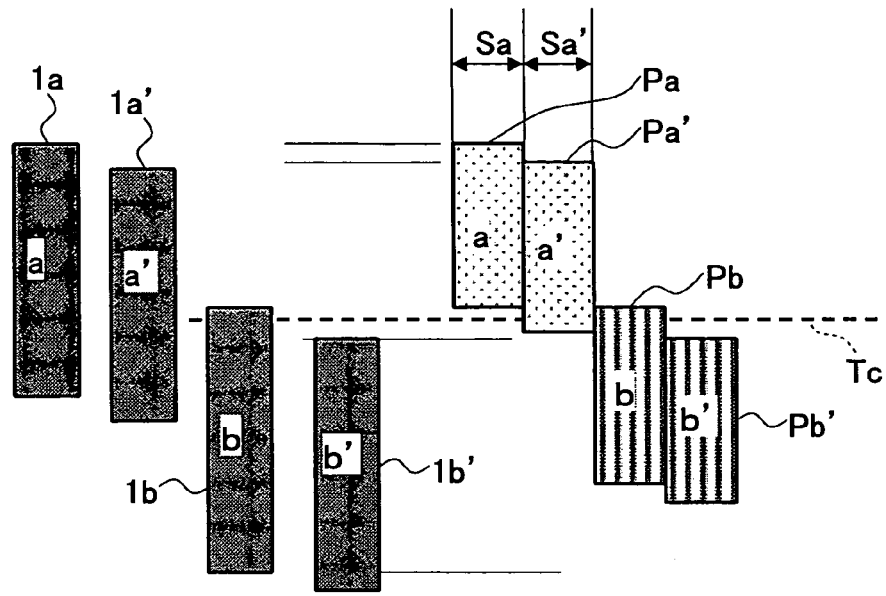
FIGS. 5A and 5B illustrate one example of a method of servo track writing over multiple rotations.
Figure 5B:
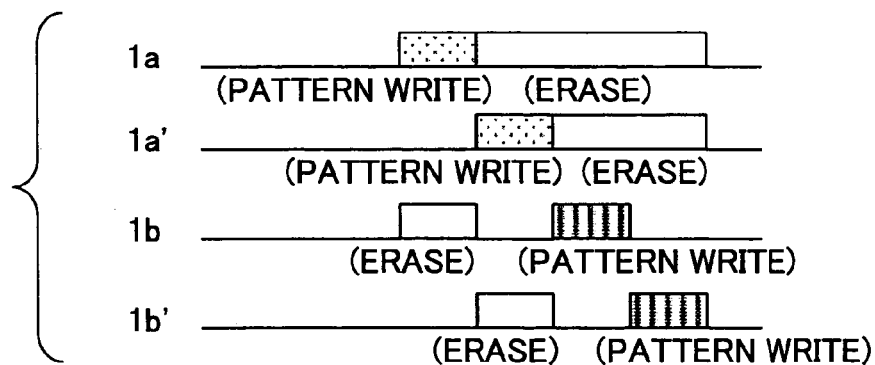

That is, in FIG. 3, FIGS. 5A and 5B, the heads are positioned at positions of 1a and 1b in a first rotation, and thereby, the burst patterns Pa and Pb are written in operation described above with reference to FIGS. 4A and 4B. After that, in a subsequent rotation, the above-mentioned head positions shift due to shaft runout. As a result, burst patterns Pa' and Pb' are written by the same heads 1a' and 1b'. In this case, in the second rotation, an error of a track center due to the above-mentioned shaft runout, i.e., an error between a point Q2 and a point Q2', or an error between a point Q3 and a point Q3' occurs.

Then, after tracking servo control is carried out after this disk-shaped recording medium is incorporated into a disk drive, an average position thereof, i.e., points Q2c and Q3c, are detected, and a control is made. As a result, an influence of the step at the joint part due to the shaft runout is reduced in half. However, in this method, two rotations of writing are required for writing one servo track. Accordingly, twice the time is required.

Figure 6:
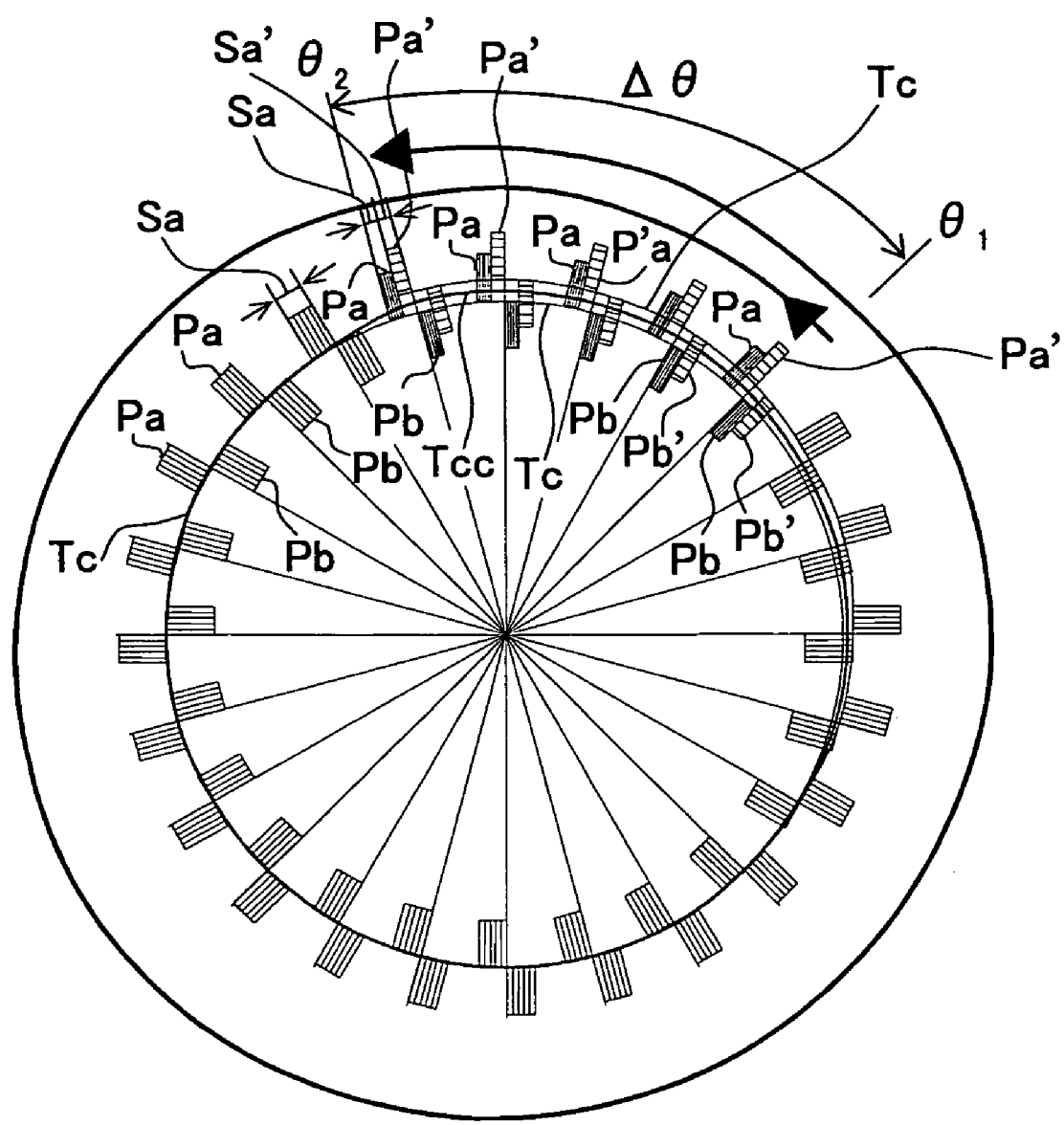
FIG. 6 illustrates a servo track writing method according to one embodiment of the present invention.

FIG. 6 shows a servo track writing method according to one embodiment of the present invention. In this case, a servo track starts from a position of a rotation angle θ1 and, after writing is carried out for one counterclockwise 360° rotation, a second writing is carried out over an angle Δθ. The second writing is ended at a position of an angle θ2.

In the dividing write method, a writing width along a track direction for each of the patterns Pa and Pb for ordinary writing, as shown in FIG. 4A, is assumed as Sa. In contrast thereto, when the dividing write method is applied, as shown in FIG. 5A, a front half Sa of the ordinary writing width is written in a first rotation for example. In a second rotation, a rear half Sa' is written. As a result, the width finally obtained is equal to that of the ordinary case. When servo patterns are written through multiple rotations, an ordinary writing width is divided into a series of sub-widths to be written over multiple rotations, and, at each rotation, the divided width is written in sequence, the method is called the dividing write method.

By applying the dividing write method, the gate time span upon reading a servo pattern can be made equal to the ordinary writing case, and thus, complications of servo control can be avoided even when the dividing write method is applied.

In the embodiment of the present invention shown in FIG. 6, different from the case of FIG. 3, writing is not carried out over a plurality of rotations for the entirety of a track, but only the angle Δθ in the vicinity of the joint part is written double.

For the other angle part, writing is carried out only once. Thus, according to the embodiment of the present invention, double writing a plurality of times is carried out only for a joint overlapping part at which there is rotational shaft runout due to NRRO of a spindle motor of a servo track writer or such. Accordingly, the influence of shaft runout due to NRRO or such can be effectively controlled, and also, the increase in time required for servo track writing can be controlled to a minimum.

Figure 7:
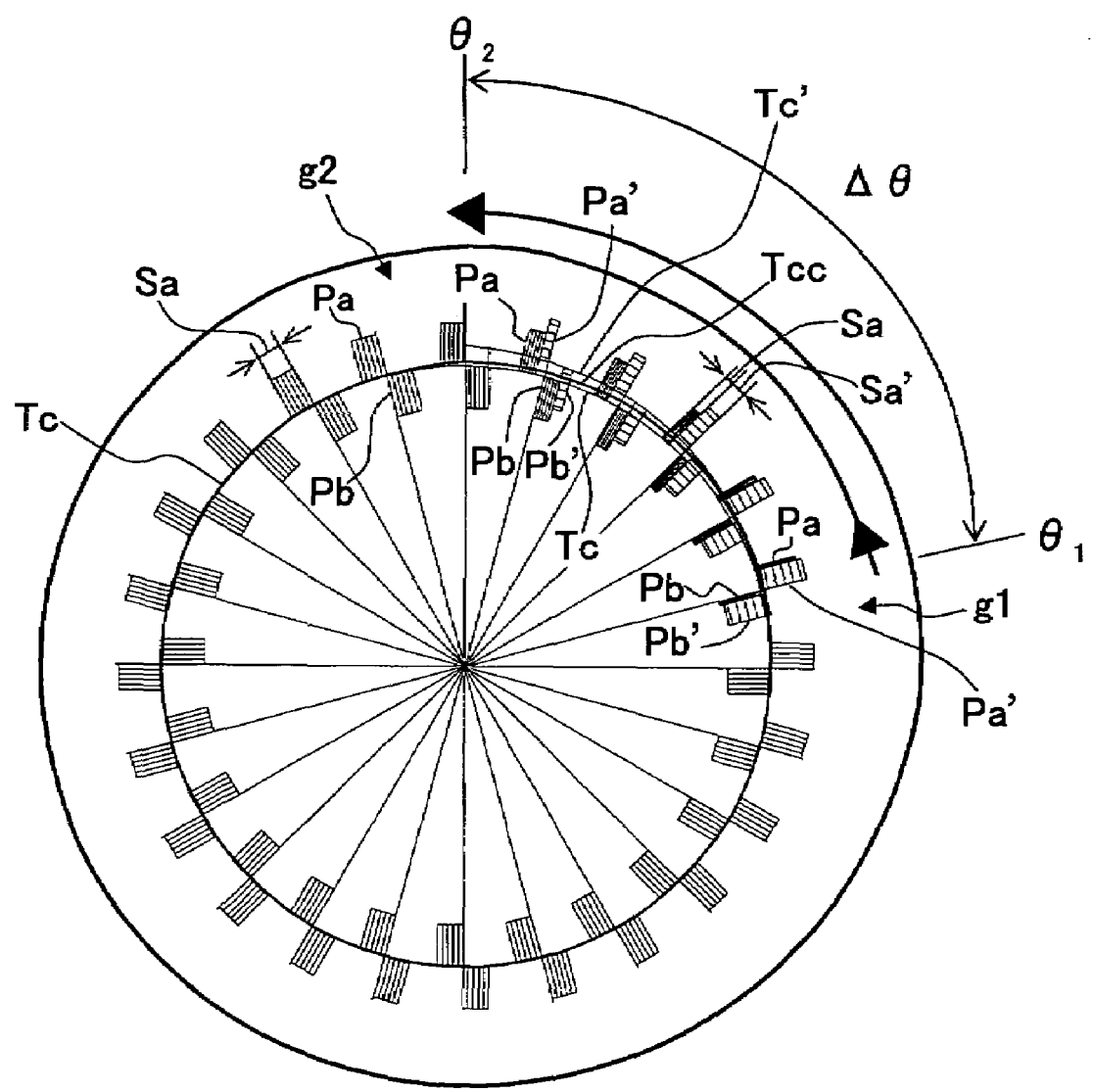
FIG. 7 illustrates a servo track writing method according to another embodiment of the present invention.

FIG. 7 shows a servo track writing method according to another embodiment of the present invention. The same as the embodiment described with reference to FIG. 6, the dividing write method is applied only for the angle part $\Delta\theta$ at the overlapped joint part. However, different from the case of FIG. 6, a pattern writing width is gradually increased for a first rotation while applying the dividing write technique, while, for a second rotation applying the dividing write technique, the writing width is gradually reduced. Further, the total of the writing widths Sa and Sa' of the first and second rotations for each sector is made always constant, and this value is set equal to the writing width Sa of a single rotation for each sector of the other part, i.e., of the non-lapping part.

For example, the writing width of the pattern Pa of a first sector g1 written during the first rotation is very narrow, the writing width is gradually increased counterclockwise, and the writing width is very wide in a last sector g2 at the end of the overlapping part. In contrast, in a second round, the writing width of the pattern Pa' is wide in a first sector g1, and, the same is very narrow in a last sector g2. As a result, the total writing width Sa and Sa' of the pattern Pa and the pattern Pa' is always constant in the overlapping part $\Delta\theta$, and is equal to the writing width Sa of the other part, i.e., of the section of the track where the dividing write method is not applied. As a result, a gate time span at a time of servo pattern reading can be made constant, and complication of servo control can be avoided, as mentioned above.

This method is advantageous for avoiding complications of control because the dividing write method is applied only for the overlapping sectors of each track, and standard servo writing is applied to the other non-overlapping part, in each of the above-mentioned embodiments of the present invention.

Further, in a method in which, as shown in FIG. 7, the magnitude of a writing width in a first rotation and a writing width in a second rotation are gradually changed, a unique advantage as described below can be obtained. That is, in FIG. 7, upon servo pattern reading, at a first angle point $\theta 1$ of the multiple part $\Delta\theta$, magnitudes of the patterns Pa' and Pb' written in the second rotation are large. As a result, a position nearer to the track center Tc' formed by the patterns Pa' and Pb' (written in the second rotation) than the track center Tc formed by the patterns Pa and Pb (written in the first rotation (initial rotation)), is detected as a track center. Then, the widths of the writing widths of the patterns Pa and Pb written in the first rotation gradually increase counterclockwise in the overlapping part $\Delta\theta$. As a result, a position nearer to the track center formed by these patterns is detected.

Thus, the track center Tcc, detected from a combination of the servo patterns written in the first and second rotations, moves from a position on a side nearer to the track center Tc' of the patterns written in the second rotation to a position nearer to the track center Tc of the patterns written in the first rotation, gradually from the first angle position $\theta 1$ through the last angle position $\theta 2$ in the overlapped part $\Delta\theta$. As a result, in a route drawn by the track center from the combination of the patterns written in the two rotations, any substantial step amount occurring in the vicinity of the both ends $\theta 1$ and $\theta 2$ of the multiple part $\Delta\theta$ (i.e., the joint overlapping part) can be effectively reduced. Therefore, the route drawn by the detected track center becomes smoother, and thus, more stable tracking servo control can be achieved.

Figure 8:
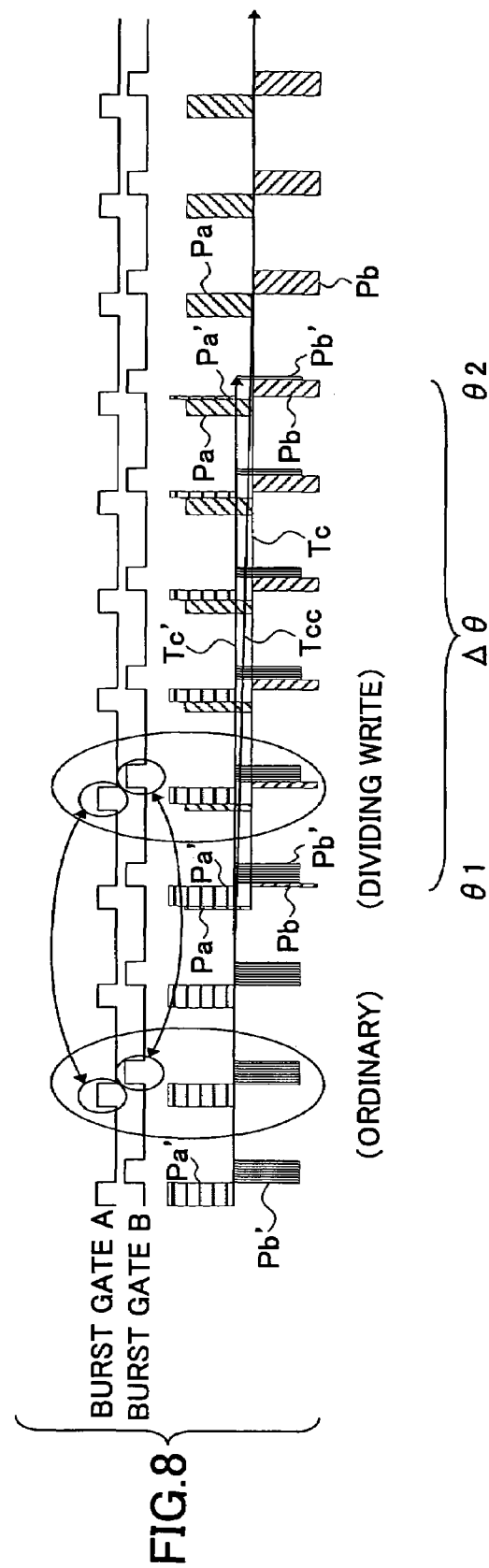
FIGS. 8, 9 and 10 respectively illustrate servo track writing methods according to other embodiments of the present invention.
Figure 9:
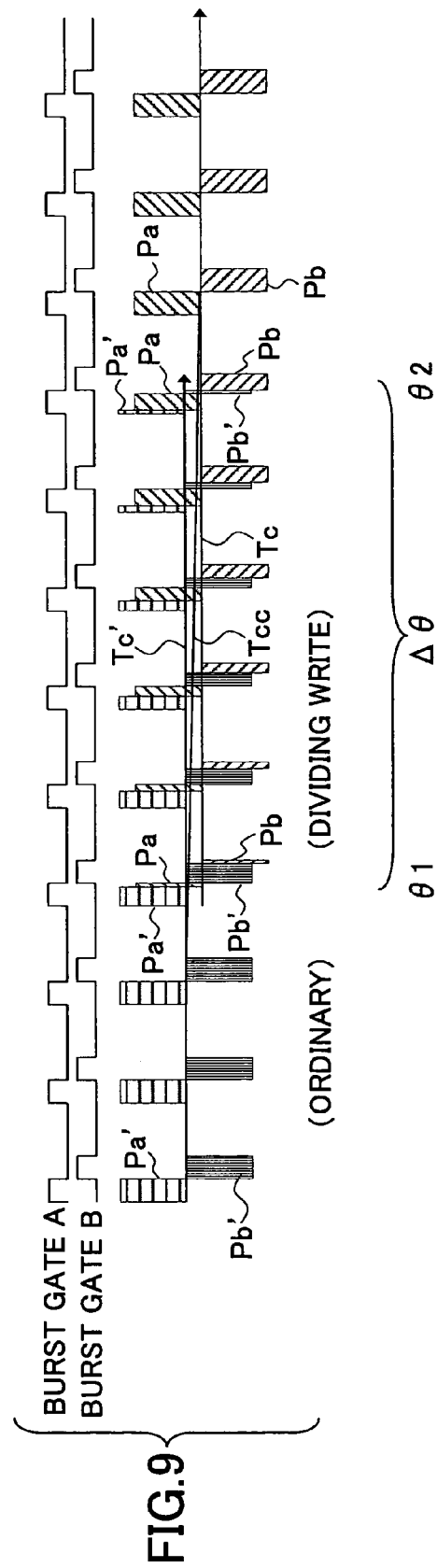
Figure 10:
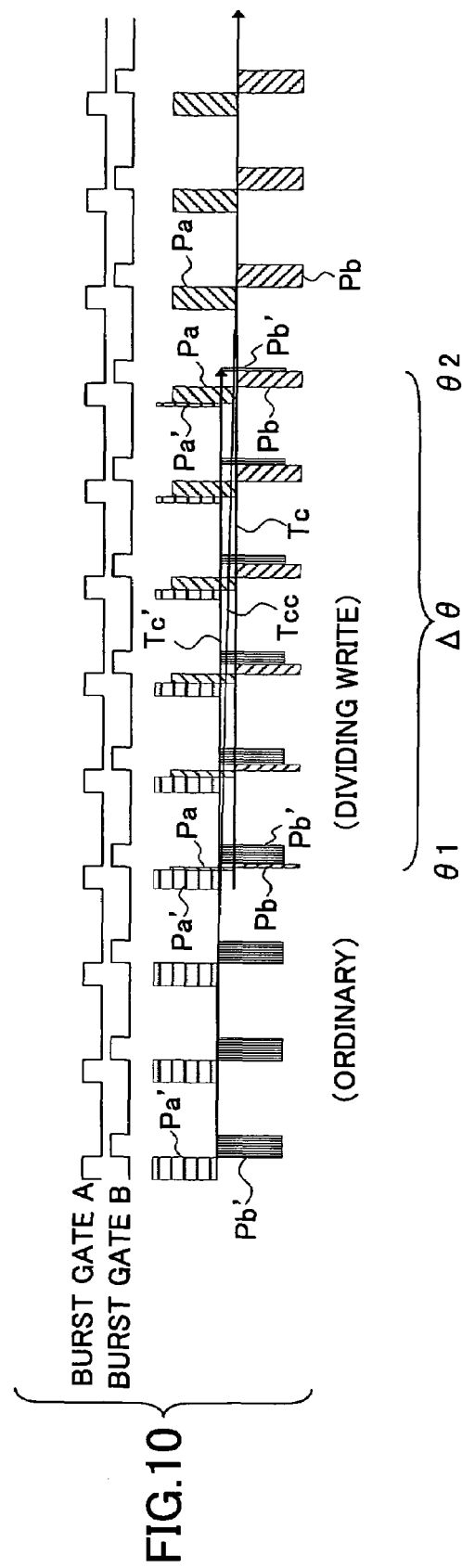

With reference to FIGS. 8 through 10, embodiments in which a writing order is changed when the dividing write method is applied is described. In respective examples of FIGS. 8 through 10, patterns Pa and Pb are written from a writing start position $\theta 1$. Then, after writing is made for a full rotation, the writing start position $\theta 1$ is again reached. After that, continuously, as mentioned above, pattern Pa' and Pb' are written doubly, and, after writing is thus doubled for $\Delta\theta$, the writing is ended at a position of $\theta 2$.

In this case, the dividing write method is applied for the overlapped part as mentioned above, and writing in the dividing manner is made with the first written patterns Pa and Pb as well as the second written patterns Pa' and Pb'. At this time, the pattern Pa' and Pb' of the second rotation are written on a trailing side of the patterns Pa and Pb first written, i.e., on the side to be read later. In contrast thereto, in an example of FIG. 9, the pattern Pa' and Pb' of the second rotation are written on a leading side of the patterns Pa and Pb written first, i.e., on the side that was read earlier. Further, in an example of FIG. 10, in one side, a pattern Pa' of a second rotation is written in front of a pattern Pa of a first rotation, while, on the other hand, a pattern Pb' of a second rotation is written after a pattern Pb of a first rotation.

Thus, when the dividing write method is applied, the order of writing in the dividing manner can be arbitrarily selected for each rotation. However, when signal reading accuracy for reading the thus-written servo patterns in servo control is considered, it is preferable that parts to be read earlier should be written afterwards, as in the example of FIG. 9. That is, when servo patterns are written by a servo track writer, in general, some time is required for stabilization of each track. Therefore, writing accuracy tends to improve in a second half which is already stabilized, in comparison to the writing start part signal. Therefore, as in the example of FIG. 9, Pa and Pb are written in the first rotation, and, when the patterns Pa' and Pb' of the second rotation are written, the second halves of the second rotation patterns Pa' and Pb' are made to overwrite so as to overlap the writing starts parts of the first rotation patterns Pa and Pb. As a result, the unstable parts of the first rotation writing start parts are overwritten by the stabilized signal parts of the second rotation second halves. Thus, in the thus obtained combined patterns combining the first rotation and second rotation patterns, the parts in which the signal is unstable can be minimized.

In contrast thereto, in a case where the writing order is reversed, the second half satisfactory parts written in the first rotation are overwritten by the first half unsatisfactory parts written in the second rotation. As a result, as a whole, there are more unsatisfactory parts.

Next, with reference to FIGS. 11A through 11D, FIGS. 12A through 12D, FIGS. 13A through 13D and FIGS. 14A through 14D, a manner of servo pattern signal reading upon carrying out tracking servo control with the use of servo patterns written as mentioned above, after the disk-shaped recording medium thus having the servo tracks written thereto is assembled in a disk apparatus, will be described.

Figure 11A:
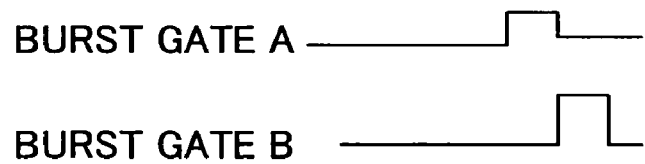
FIGS. 11A, 11B, 11C and 11D illustrate a principle of positional error detection according to an amplitude detecting method.
Figure 11B:
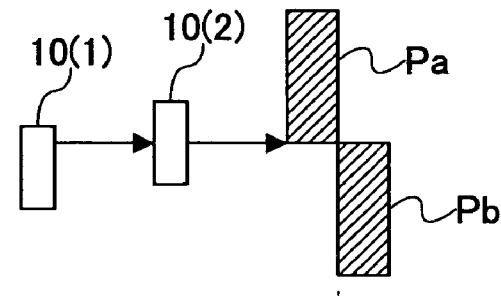
Figure 11C:
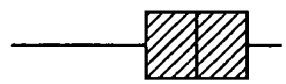
Figure 11D:
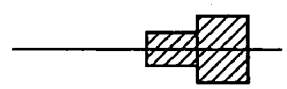

FIG. 11A shows a timing chart of a burst gate signal upon reading a servo pattern (servo burst) signal. FIG. 11B shows a manner in which servo patterns Pa and Pb written to the disk-shaped recording medium as mentioned above are read by a reading head 10 of the disk drive. FIGS. 11C and 11D show servo signals obtained from each of a case where the reading head 10 of FIG. 11B properly follows the track (10 (1)), and a case where the reading head 10 follows the track in a condition in which it rather approaches the side of the pattern Pb (10(2)), respectively.

As shown, when the track is properly followed as shown in FIG. 11C, the head 10 properly reads the patterns Pa and Pb. As a result, an amplitude of the servo signal thus obtained is such that a first half taken with a burst gate A signal is equal to a second half taken with a burst gate B signal. On the other hand, when the track is followed in a manner other than approaching one side as shown in FIG. 11D, the head 10 approaches the side of the pattern Pb, and as a result, a pattern signal that is detected stronger from the pattern Pb than pattern Pa. As a result, as shown in the figure, a detected amplitude becomes larger in the second half taken with the burst gate B signal than the first half taken with the burst gate A signal. Thus, with the use of the servo signal read by the head 10, whether the head properly carries out tracking or instead approaches either side can be detected.

Figure 12A:
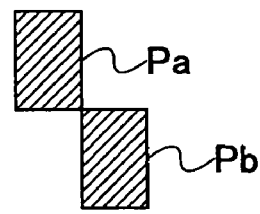
FIGS. 12A and 12B show, in a comparison manner, servo bursts and burst gates detecting them (#1).
Figure 12B:
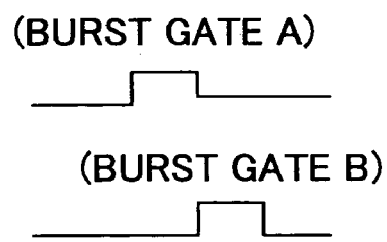
Figure 13A:
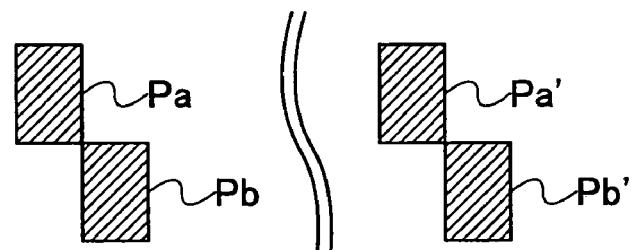
FIGS. 13A and 13B show, in a comparison manner, servo bursts and burst gates detecting them (#2).
Figure 13B:
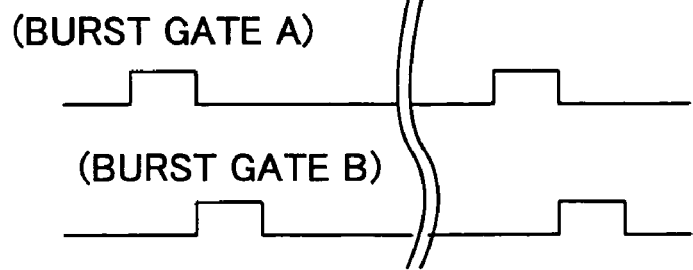

With reference to FIGS. 12A, 12B, FIGS. 13A and 13B, a problem occurring when, for the purpose of averaging an influence of rotational shaft runout by NRRO of a spindle motor of a servo track writer or such as described above, writing is made in a multiple manner when each servo track is written, will be described. FIGS. 12A and 12B shows common burst gate signals applied for servo pattern reading such as those described with reference to FIGS. 11A through 11D. In contrast thereto, FIGS. 13A and 13B show an example in which when patterns are written through multiple rotations as mentioned above, patterns Pa, Pb, Pa' and Pb', having ordinary widths shown in FIGS. 12A and 12B, are written through two rotation, without applying the dividing write method. When the patterns are thus multiply written with the ordinary widths, the burst gate signals of the disk drive to read them should also be generated in a multiple manner correspondingly. As a result, servo control is complicated.

Figure 14A:
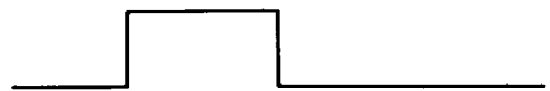
FIGS. 14A, 14B and 14C illustrate a principle of positional error detection according to an amplitude detecting method upon applying a multiple writing method according to the present invention.
Figure 14C:
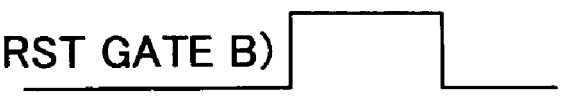
Figure 14B:
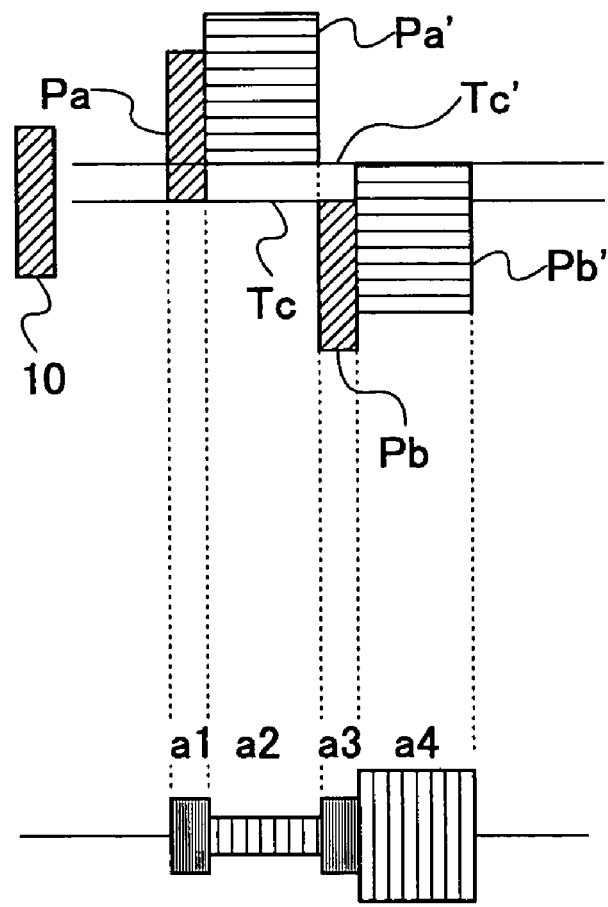

FIGS. 14A through 14C show a positional error detecting method according to one embodiment of the present invention for a case where the dividing write method is applied to the above-mentioned multiple writing. That is, respective widths of the patterns Pa, Pb, Pa' and Pb' written in the two rotations as mentioned above along the track direction are adjusted, both are written continuously back and front, and a total width of the continuous patterns are made equal to the ordinary pattern width obtained when multiple writings are not made. As a result, the burst gate signal applied for reading is the same as that of the case where no multiple writings are present.

A case where patterns shown in FIG. 14B are read by a reading head 10 will be described. In this case, as described above with reference to FIGS. 11A through 11D, the head 10 reads the patterns Pa and Pa' during a high level of a burst gate A signal.

Generally speaking, a servo signal having an amplitude in proportion to an area overlapping between the reading head 10 and the servo pattern is obtained, and, in this case, the servo signal shown in FIG. 14C is obtained. That is, in the case of FIG. 14B, according to the patterns Pa and Pb written in the first rotation, a track center Tc is traced. Thereby, parts a1 and a3 of the servo signal for these patterns Pa and Pb have equal amplitudes. In contrast thereto, the head 10 rather approaches one side of the Pb' with respect to a track center Tc' of the pattern Pa' and Pb' written in the second round. As a result, the detected amplitude a4 from the pattern Pb' becomes larger than a detected amplitude a2 from the pattern Pa'

In this case, actual tracking servo control is carried out as a result of an area (integrated value) of the detection signals a1 and a2, obtained with the burst gate A signal being compared with an area (integrated value) of the detection signals a3 and a4, obtained with the burst gate B signal. That is, in the case of FIG. 14C, the integrated value of the burst gate A signal is clearly larger than the integrated value of the burst gate B signal, and thereby, a state that the head approaches the side of Pb and Pb' can be easily detected. To the contrary, when both integrated values agree with one another, it is determined that tracking is being carried out properly.

Thus, upon tracking servo control in the disk drive, when the dividing write method is applied, in addition to an intensity of the servo pattern detected by the reading head 10, a duration thereof may also be used. As a result, by changing a writing width of the burst pattern in the track direction upon servo pattern writing as described above with reference to FIG. 7, a position determined as a track center of a combination of patterns written in the dividing write method upon servo signal reading can be arbitrarily adjusted. As a result, as described above with reference to FIG. 7, by gradually changing magnitudes of patterns written in respective rounds, an influence of a step at a track joint part can be effectively reduced.

Thus, according to the embodiment of the present invention, a step at a joint part of a servo track occurring due to NRRO of a spindle motor or such upon servo track writing can be controlled so that it can be connected smoothly, and, the servo track can be written within a short time. Accordingly, positioning accuracy by tracking servo control can be improved, and a magnetic disk drive having a high reliability can be achieved.

The above-mentioned servo track writer may be controlled by a computer. In this case, a program for executing the servo track writing method described above according to the embodiment of the present invention may be prepared. Then, this program may be read by the above-mentioned computer, and the apparatus may be made to operate according to the program. Thus, the desired servo patterns Pa, Pb, Pa' and Pb' can be written to the disk-shaped recording medium.

Further, the respective servo patterns Pa, Pb, Pa' and Pb' have been described as those according to the amplitude detecting method in the above-mentioned embodiments. However, as described later with reference to FIG. 31B, patterns according to the above-mentioned phase detecting method may also be applied.

Further, as shown in FIGS. 6 and 7, and so forth, the 'overlapping part' Δθ might not be necessary in one servo track, and, another servo track may need a plurality of angular parts (see FIG. 3). In that case, the above-mentioned 'overlapping part' may be provided for each joint part. By such a method, a plurality of overlapping parts may be provided in one servo track.

Further, as will be described later with reference to FIGS. 32A and 32B, the number of sectors included in the above-mentioned 'overlapping part' Δθ may be increased/decreased according to the magnitude of a step generated at a joint part of a servo track due to NRRO or such. That is, when the step is large, the number of sectors included in the overlapping part is increased, and thus, the overlapping part Δθ is enlarged. On the other hand, when the step is small, the number of sectors of the overlapping part can be reduced. By increasing/decreasing the overlapping part according to the magnitude of the step, the time required for servo track writing can be reduced as a result of the overlapping part being reduced when the step is small. Thus, efficiency of the servo track writing process can be improved.

Figure 15:
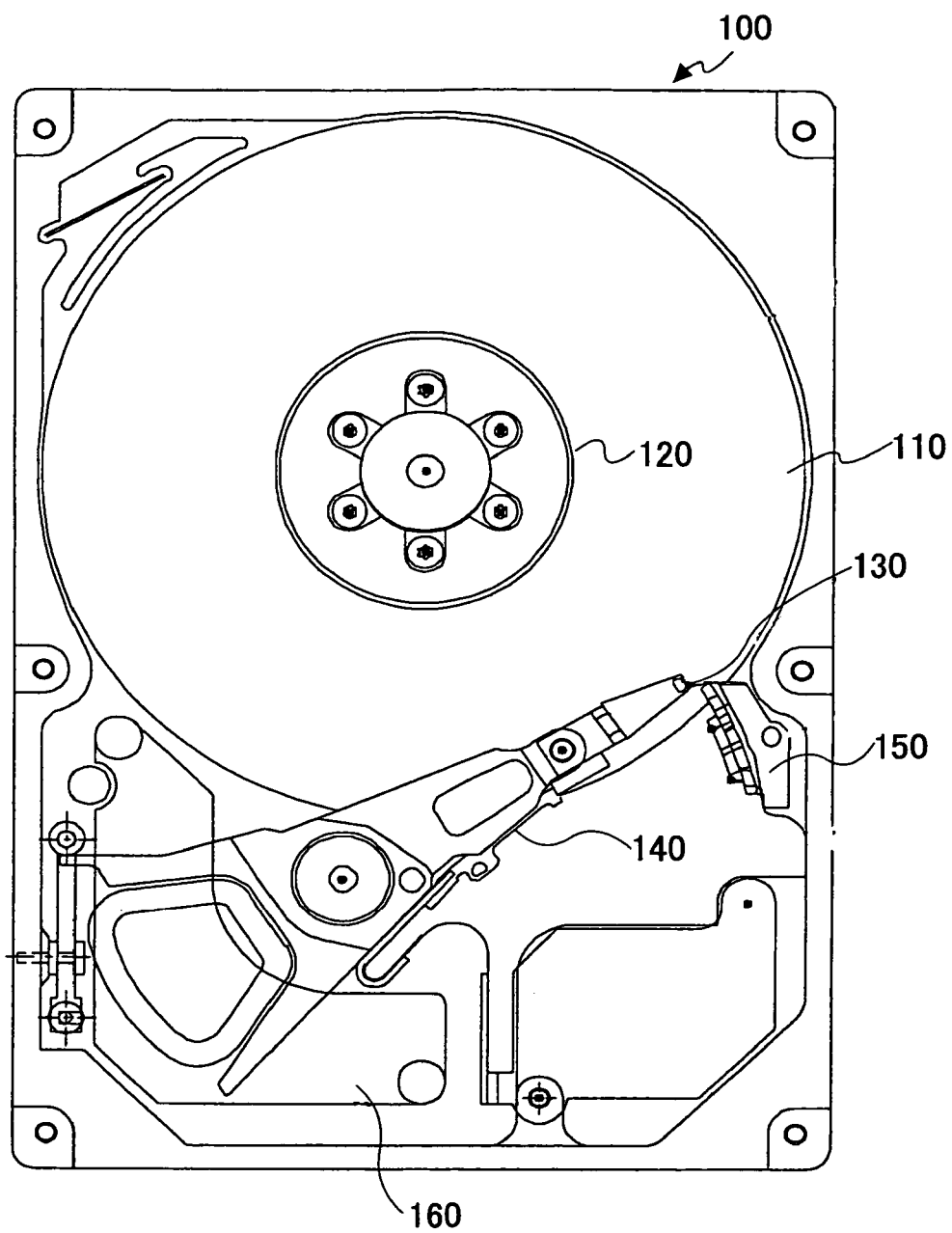
FIG. 15 shows a plan view of a general configuration of one example of an information recording/reproduction apparatus according to one embodiment of the present invention.

FIG. 15 shows a plan view of a general configuration of a hard disk drive according to one embodiment of the present invention. As shown, the hard disk drive includes a disk-shaped medium (hard disk: magnetic disk) 110, as a recording medium; a spindle motor 120 rotating and driving it; a magnetic head 130 writing information to the medium 110 or reading information recorded therein; an actuator arm assembly 140 moving the head 130 in a radial direction of the medium 110 by rotating an arm; and a magnetic circuit 160 controlling the rotating operation of the actuator arm assembly.

Figure 16:
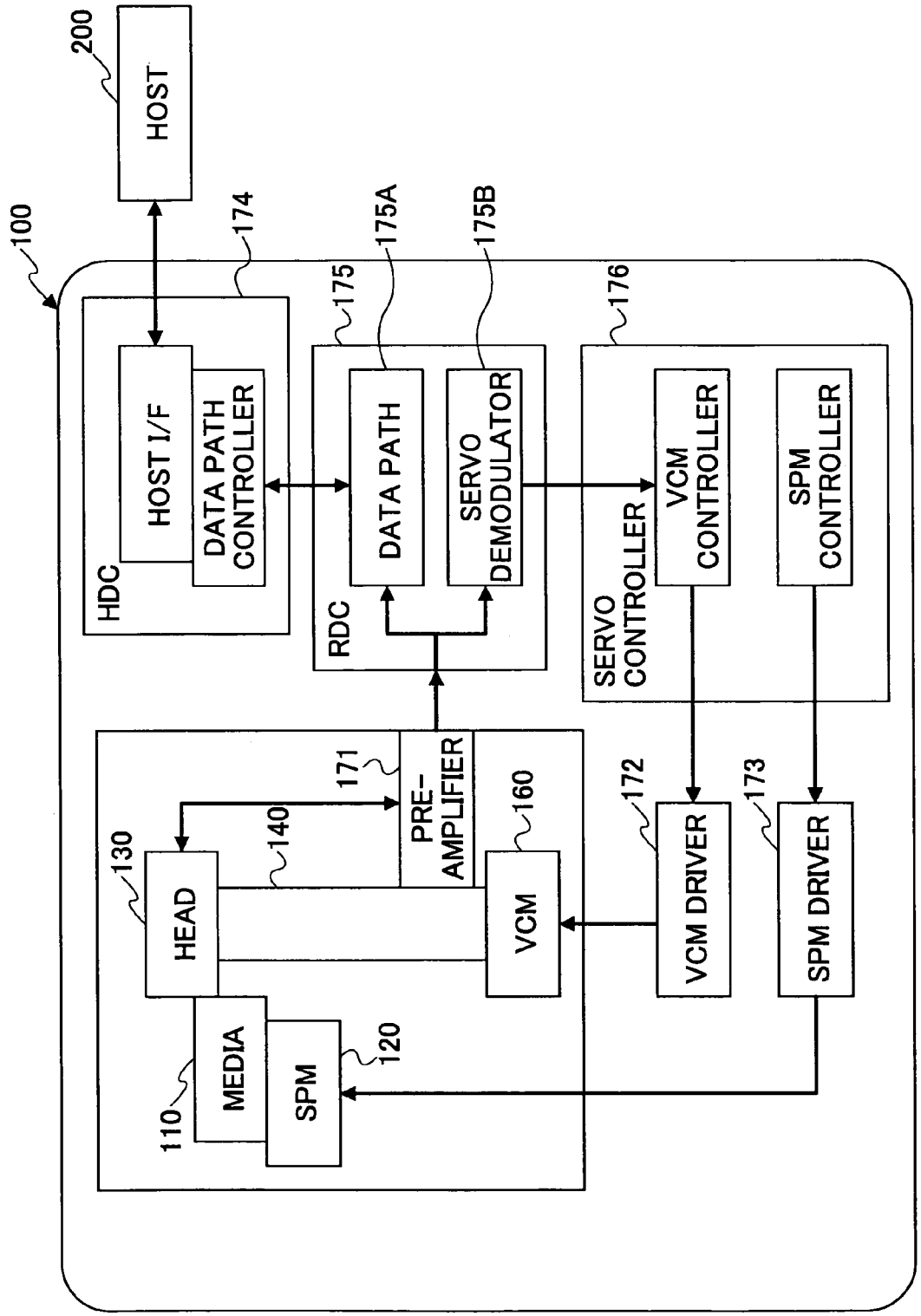
FIG. 16 shows an internal block diagram of a control system of the information recording/reproduction apparatus shown in FIG. 15.

FIG. 16 shows a block configuration of a control system of the hard disk drive shown in FIG. 15. The control system includes a pre-amplifier 171 amplifying a signal read from the medium 110 by the magnetic head 130; a read channel circuit 175 processing the amplified reproduced signal, separating it into servo information and a data signal, transmitting the servo information to a servo controller 176 and transmitting the data signal to a hard disk controller 174; the hard disk controller 174 carrying out predetermined processing on the data signal and transmitting the same to a host apparatus 200; the servo controller 176 generating, based on the detected servo information, a control signal for a VCM driver controlling the actuator arm assembly 140, and also generating a control signal for a SPM driver controlling the spindle motor 120; a VCM driver 172 controlling operation of the actuator arm assembly 140 via a VCM (voice coil motor) 160 based on the control signal; and a SPM driver 173 carrying out rotation control of the medium 110 via the spindle motor 120.

Figure 17:
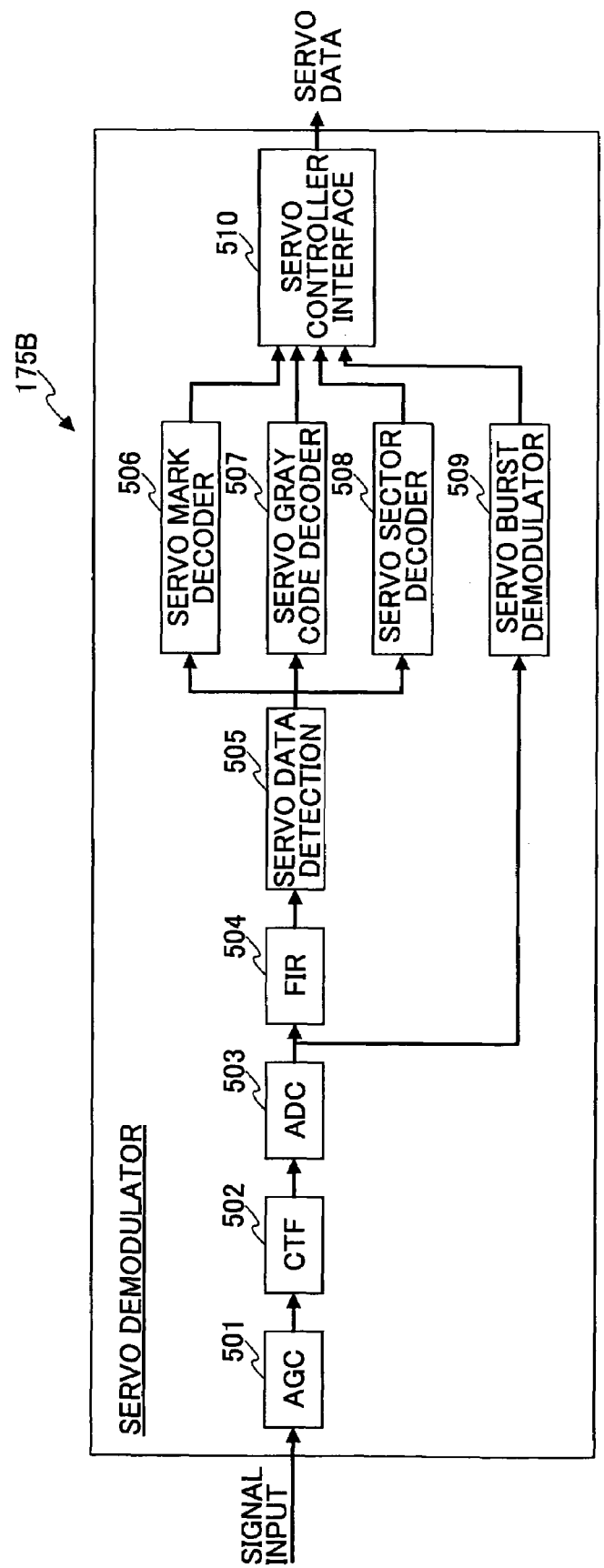
FIG. 17 shows an internal block diagram of a servo demodulator shown in FIG. 16.

Next, operation of a servo demodulator 175B included in the read channel circuit 175 is described in detail. First, with reference to FIG. 17, operation of a common servo demodulator will be described. A servo signal read by the magnetic head 130 is amplified by the pre-amplifier 171, and is input to the servo demodulator of the read channel circuit 175. The input servo signal is input to an AGC (automatic gain control amplifier) 501, where an amplitude of the signal is modified to be uniform. This function of the AGC is provided for avoiding occurrence of a problem caused by a fluctuation of a head output due to characteristics of the magnetic head and the disk-shaped medium, a variation of a head floating height, a difference in a recording density between an inner side and an outer side of the disk-shaped medium, or such.

The output of the AGC 501 is input to a CTF (continuous time filter) 502, where adjustment of an unnecessary high frequency zone component included in the head output or such is carried out, whereby a detector in a subsequent stage can carry out a detection operation properly. Next, an output of the CTF 502 is input to an ADC (AD converter) 503. This converts the input signal into a discrete state and quantizes the same, whereby subsequent processing can be carried out as numerical calculations. Next, the signal undergoes waveform shaping in a FIR (finite impulse response filter) 504, whereby the subsequent detector can carry out the detecting operation properly.

Next, the signal is input to the servo detector 505, where the input signal is converted into a bit stream of 1 and 0. The bit steam thus obtained is decoded in the servo mark decoder 506, and thus, a servo mark is detected. The servo mark is applied as a synchronization pattern for demodulating a servo pattern, and the information is then applied to carry out synchronization in a servo gray decoder 507, a servo sector decoder 508, a servo burst demodulator 509 and so forth.

The servo gray code decoder 507 decodes the bit stream from the servo data detector 505, and detects a gray code. Further, the servo sector decoder 508 decodes the bit stream from the servo data detector 505, and detects a servo sector number. The servo burst demodulator 509 demodulates a servo burst signal from the output signal of the ADC 503 with a servo mark detection signal from the servo mark decoder 506 as reference timing. A servo control interface 510 transmits information, obtained from the servo mark decoder 506, the servo gray code decoder 507, the servo sector decoder 508 and the servo burst demodulator 509, to the servo controller 176 as servo data.

Next, a configuration of the servo demodulator 175B in the disk drive in the embodiment of the present invention is described. In the embodiment described below, a demodulation method is changed for the servo pattern multiple writing part Δθ, described above with reference to FIGS. 6 through 8, and the non-overlapping part. As described above, to the overlapping writing part Δθ, servo patterns are written through two rotations (in the dividing write manner). The reading method for the servo patterns written in such a manner has been described with reference to FIGS. 14A through 14C, in which, a common single burst gate pulse (burst gate A) is applied to read the servo patterns Pa and Pa' written in the different rotations. However, this method should not be limited thereto, and, respective different burst gate pulses may be applied for these servo patterns Pa, Pa', and so forth, written in the dividing manner through the different rotations. Then, these may be read in the respective burst data timings. Such a manner is applied in respective embodiments described below.

Figure 18C:
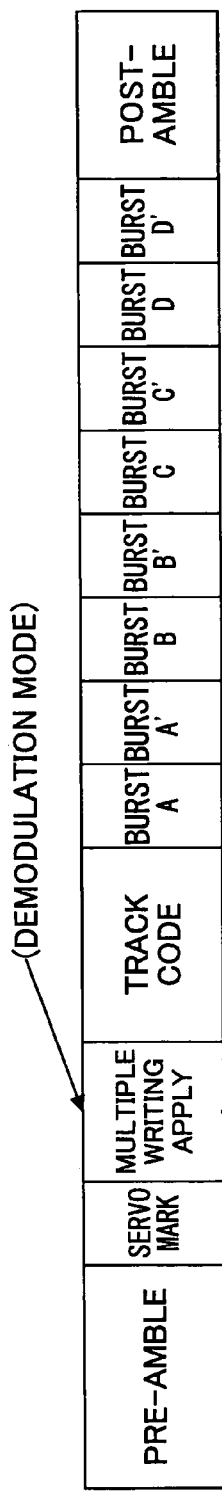

An embodiment shown in FIGS. 18A through 18D is such that predetermined demodulation mode designation information, i.e., information shown as 'multiple writing N/A', 'multiple writing apply' in FIGS. 18A and 18C, is inserted. When this embodiment is applied, as shown in FIG. 19, a demodulation decoder 511 is provided in the servo demodulator, wherein, from the received signal, the above-mentioned demodulation mode designation information is read. Then, according to a result thereof, a burst gate pulse for reading a servo pattern (for example, the patterns Pa and Pb shown in FIG. 2 and FIG. 4A) written by ordinary 'single write' is generated as each burst gate pulse as shown in FIG. 18B for a case of 'multiple writing N/A'. Thereby, the servo burst demodulator 509 detects the servo pattern from the received signal according to a principle described above with reference to FIGS. 11A through 11D.

Figure 18D:
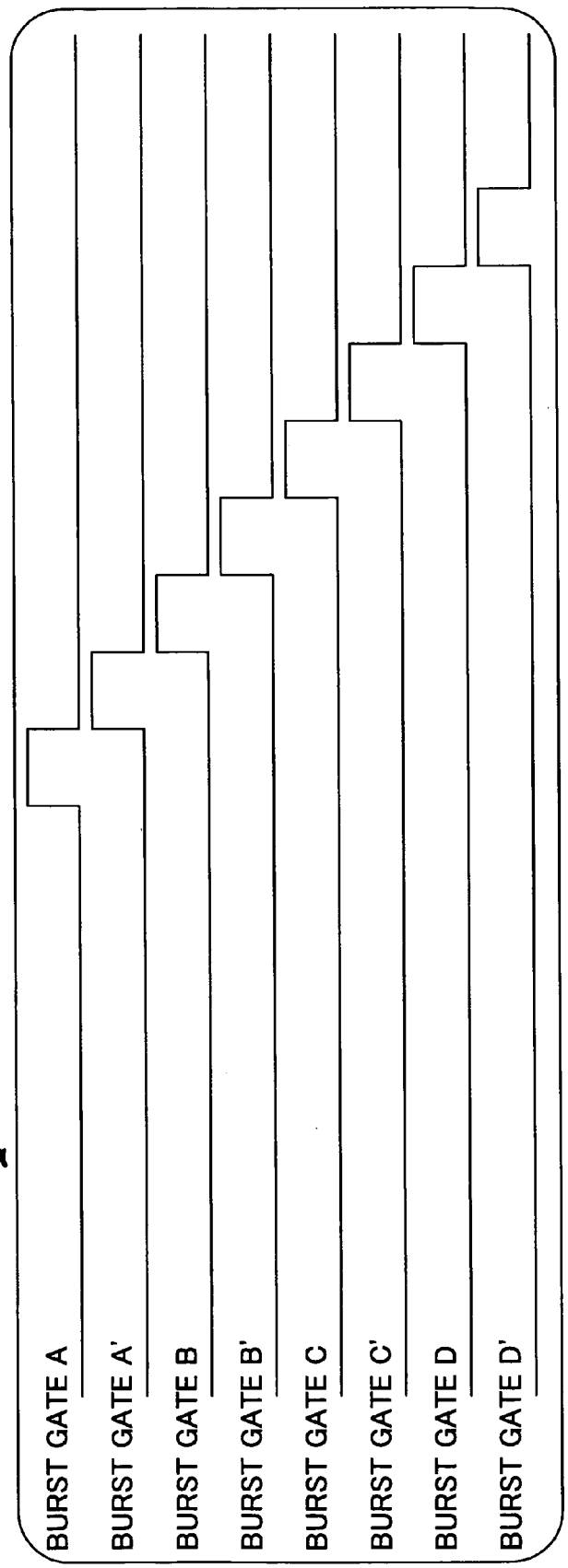
Figure 19:
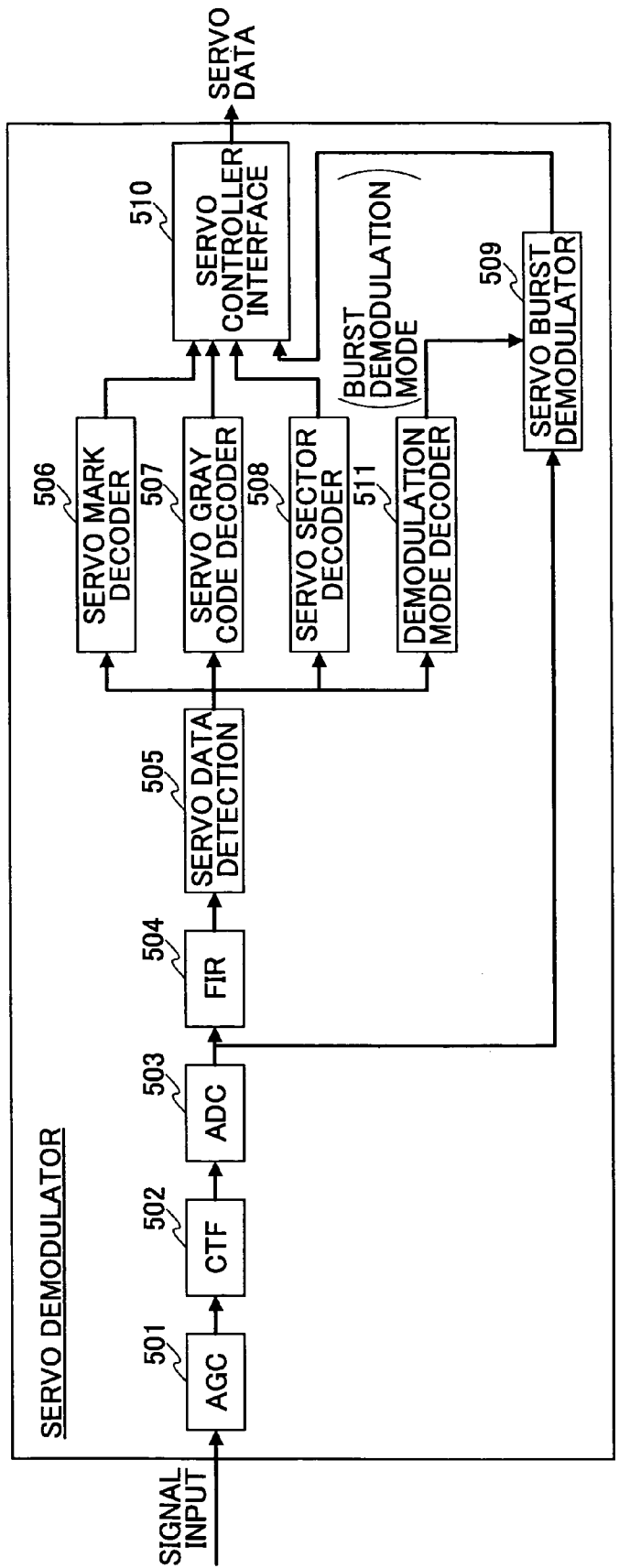
FIG. 19 shows a block diagram of a servo demodulator for carrying out the method shown in FIGS. 18A through 18D.

On the other hand, for a case of 'multiple writing apply', a pulse for reading a servo pattern (for example, patterns Pa, Pb, Pa', Pb' shown in FIG. 3, FIG. 4B) written by the above-mentioned 'writing in a plurality of rounds' is generated as each burst gate pulse as shown in FIG. 18D. In this case, as shown, pulses having half periods at a double frequency are applied, with respect to the gate pulses of FIG. 18B. That is, different from the case described above with reference to FIGS. 14A through 14C, the gate pulses A, A', B and B', having pulse widths corresponding to the above-mentioned respective servo patterns Pa, Pb, Pa' and Pb' are applied for reading the servo patterns. In the example shown in FIGS. 18A through 18D, a total of four sets of servo patterns including two sets, i.e., Pc, c', Pd and Pd' in addition to the above-mentioned two sets, i.e., Pa, Pb, Pa' and Pb', are written.

Figures 20A, 20B:
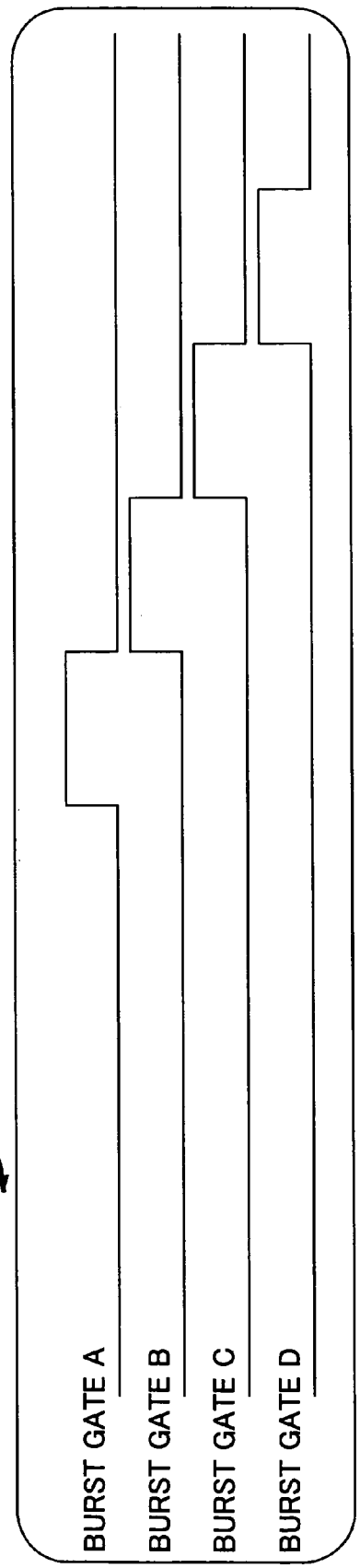
Figure 21:
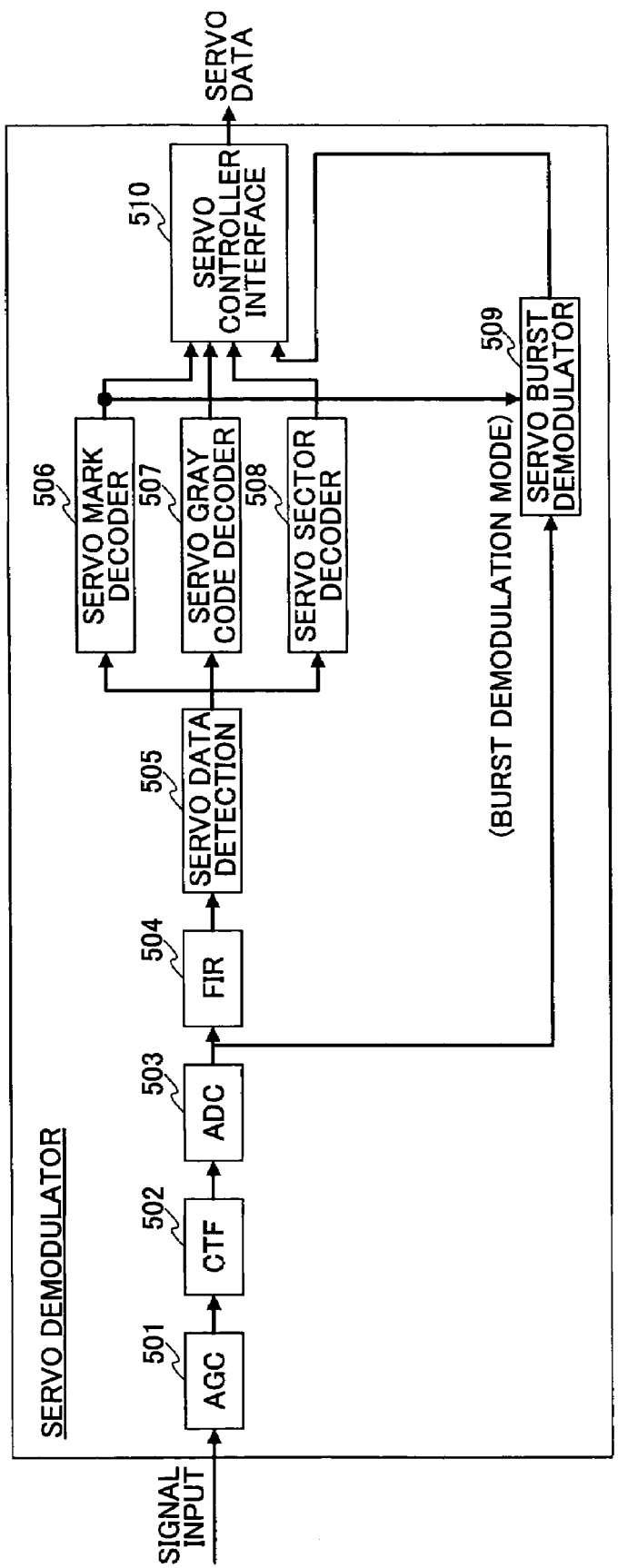
FIG. 21 shows a block diagram of a servo demodulator for carrying out the method shown in FIGS. 20A through 20D.

In an embodiment shown in FIGS. 20A through 20D, an existing servo mark is utilized as the above-mentioned demodulation mode determination information. That is, a type of the servo mark is previously distinguished and selected for the demodulation mode to apply for each servo sector. Then, upon demodulation, the demodulation mode to apply is determined. In this case, as shown in FIG. 20, a demodulation mode decoder should not be particularly provided separately. Servo mark information is obtained from being decoded by the existing servo mark decoder 506, the type of the corresponding servo mark is detected therefrom, and therewith, the demodulation mode to apply is recognized. The recognition result is then transmitted to the servo burst demodulator 509 from the servo mark decoder 506. In the servo burst demodulator 509, a burst gate pulse shown in FIG. 20B or 20D is applied according to the recognition result, and thereby, servo pattern information included in the servo sector is detected as in the above-mentioned embodiment.

Figure 23:
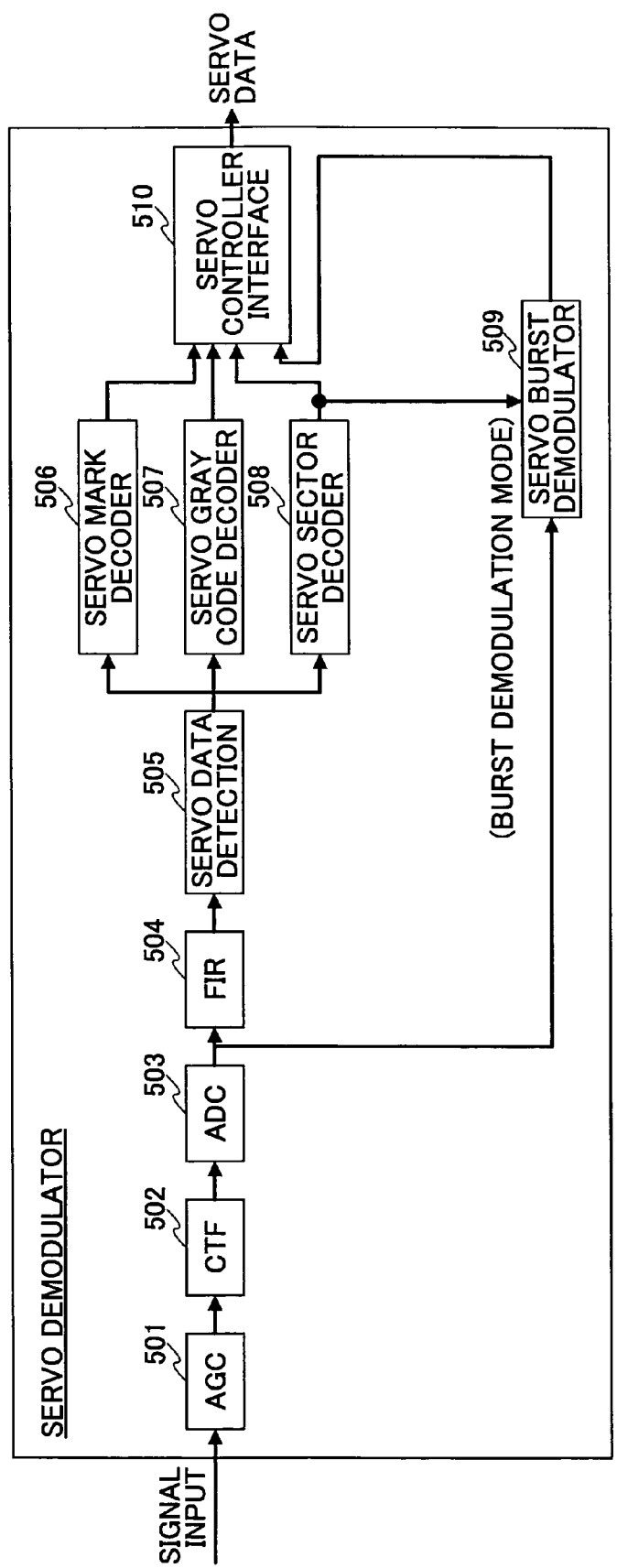
FIG. 23 shows a block diagram of a servo demodulator for carrying out the method shown in FIGS. 22A through 22D.

In an embodiment shown in FIGS. 22A through 22D, a servo sector number allocated for each servo sector is utilized as the above-mentioned demodulation mode determination information. In this case, as shown in FIG. 23, in the servo demodulator, the servo sector number obtained as a result of a sector code included in the servo sector being decoded by the existing servo sector decoder 508, is transmitted to the burst demodulator 509. In the servo burst demodulator 509, the demodulation mode to apply is determined from the sector number, and, a burst gate pulse shown in FIG. 22B or 22D is applied according to the determination result. Thereby, servo pattern information included in the servo sector is detected as in the above-mentioned embodiment.

Figure 25:
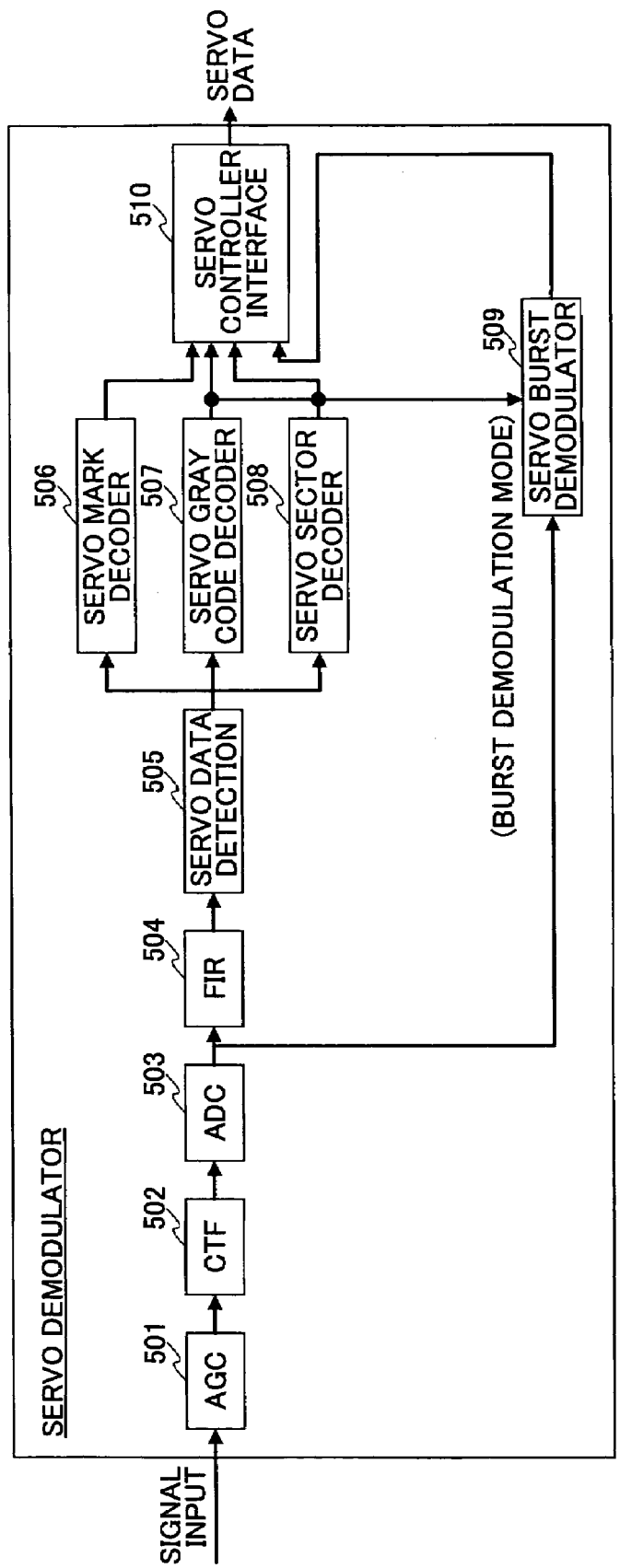
FIG. 25 shows a block diagram of a servo demodulator for carrying out the method shown in FIGS. 24A through 24D.

In an embodiment shown in FIGS. 24A through 24D, both the servo sector number and a track number allocated for each servo sector are utilized as the above-mentioned demodulation mode determination information. In this case, as shown in FIG. 25, in the servo demodulator, information of the sector number obtained as a result of the sector code being decoded by the servo sector decoder 508 and a track number obtained as a result of the track code being decoded by the servo gray code decoder 507, is applied to determine the demodulation mode to apply. That is, the respective information of the above-mentioned sector number and the track number are transmitted to the servo burst demodulator 509, where the demodulation mode to apply is determined, and, a burst gate pulse shown in FIG. 24B or 24D is applied according to the determination result. Thereby, servo pattern information included in the servo sector is detected as in the above-mentioned embodiment.

Figure 26:
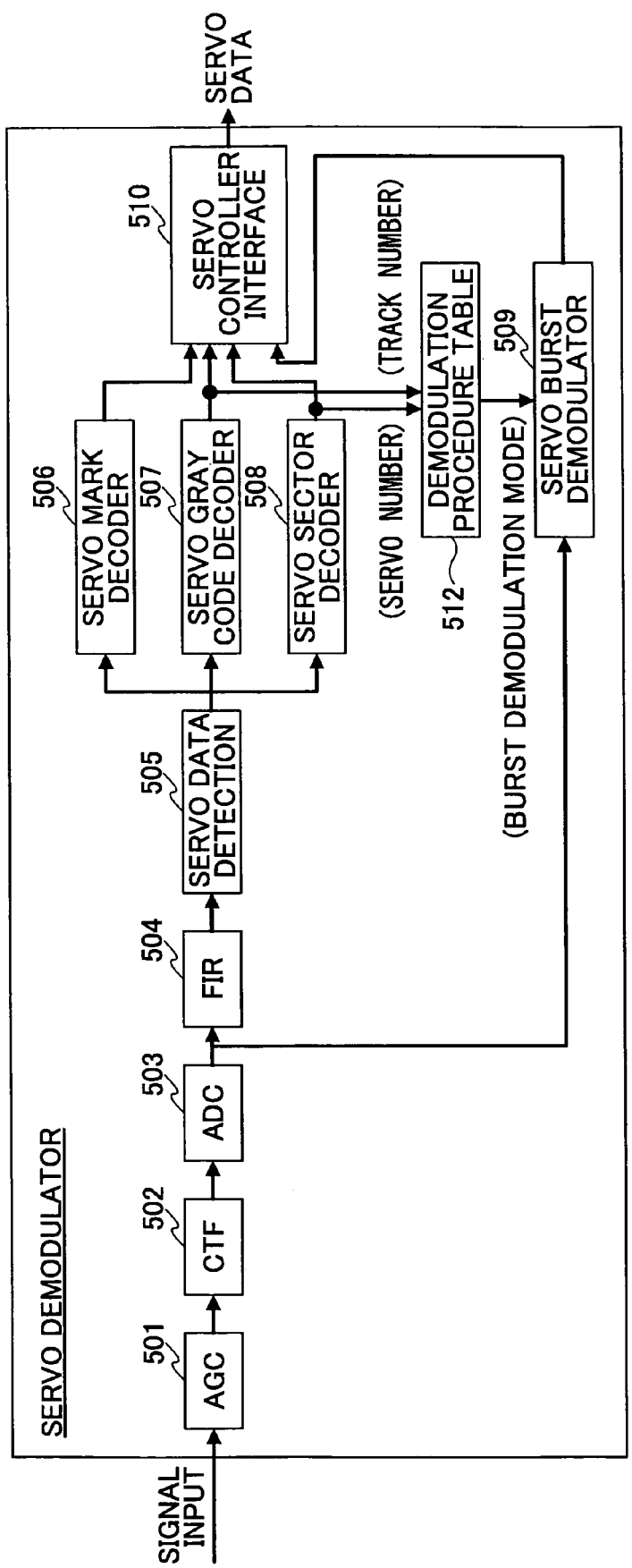
FIG. 26 shows a block diagram of a variant of the above-mentioned embodiment.
Figure 27:
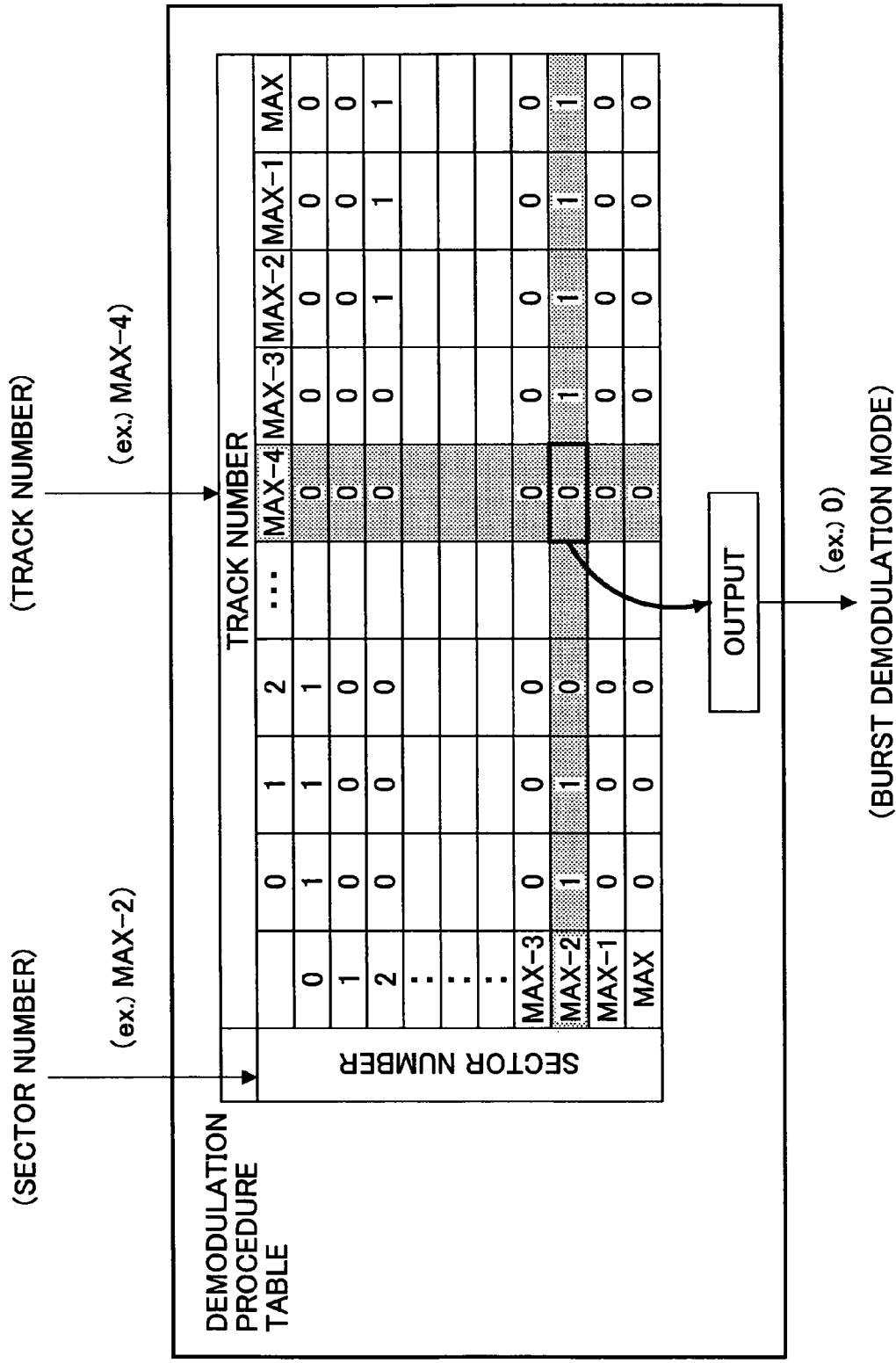
FIG. 27 shows one example of the contents of a demodulation procedure table shown in FIG. 26.

FIGS. 26 and 27 illustrate a variant of the embodiment described with reference to FIGS. 24A through 24D. This variant embodiment has a demodulation procedure table 512 in the servo demodulator as shown in FIG. 26. From this table, the track number and the sector number obtained from the servo gray code decoder 507 and the servo sector decoder 508, respectively, are applied as a key, and the demodulation mode to apply is obtained. FIG. 27 shows one example of table data included in the above-mentioned demodulation procedure table 508.

In this table, a number "0" indicates a sector in which a servo pattern in 'single write' is applied. On the other hand, a number "1" indicates a servo sector in which a servo pattern written in the above-mentioned 'multiple rotations' is applied. For example, assuming that the track number and the sector number of the servo sector obtained from the servo gray code decoder 507 and the servo sector decoder 508 respectively are MAX-2 and MAX-4, the number "0" is obtained from the table as shown, which is then supplied to the servo burst demodulator 509. Since the number "0" corresponds to a servo sector in which a servo pattern of ordinary 'single write' is applied, the corresponding servo gate pulse (FIG. 24B) is applied.

Figure 28:
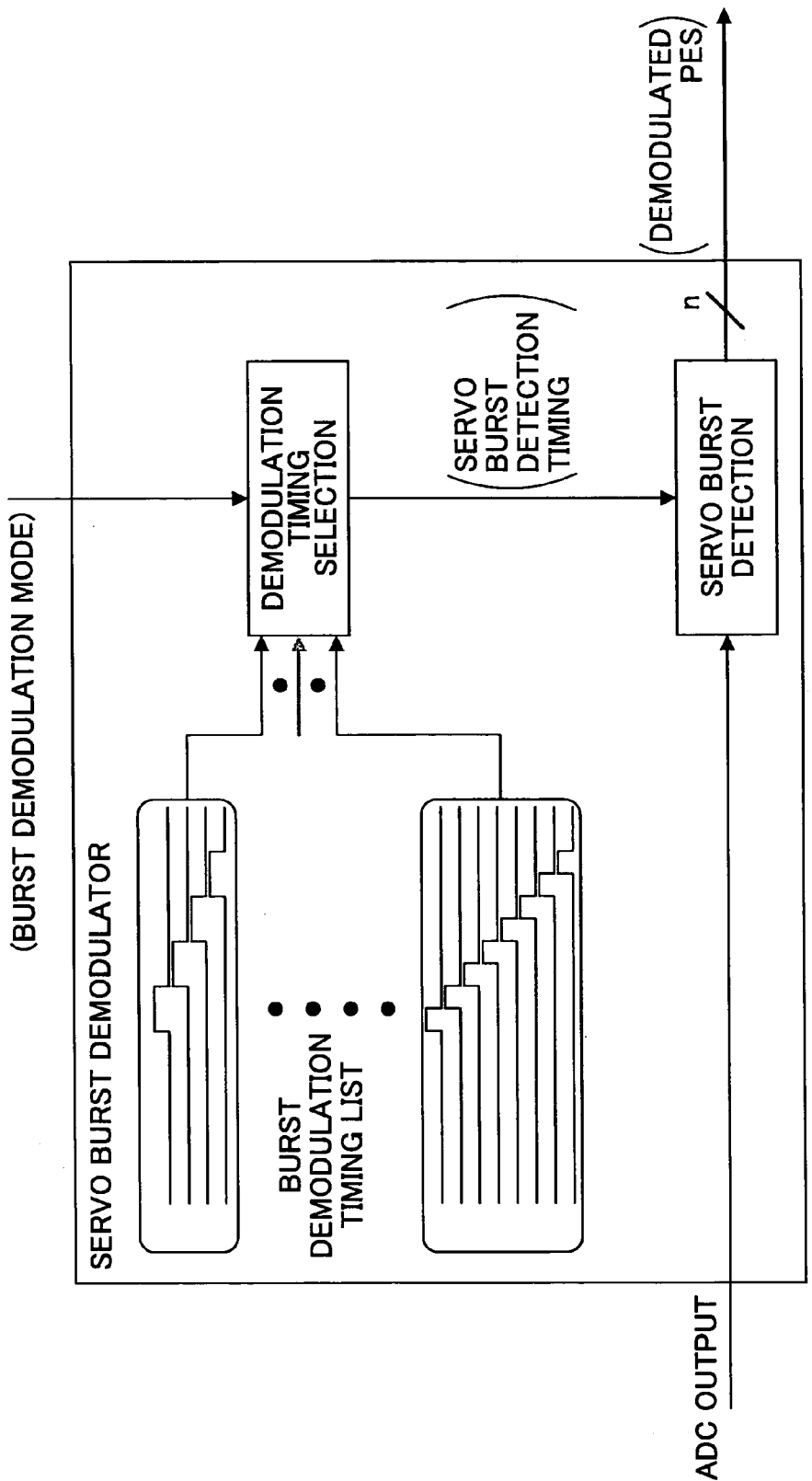
FIG. 28 shows a block diagram of a configuration example of a servo burst demodulator applicable to each of the above-mentioned embodiments.

FIG. 28 shows one example of a configuration of the servo burst demodulator applicable to each of the above-mentioned embodiments. In this example, as shown, the servo burst demodulator includes a demodulation timing selector and a servo burst detector. The demodulation timing selector selects a corresponding burst gate pulse generation timing to apply, with an input of the above-mentioned burst demodulation mode information (sector number, track number and so forth). The thus-selected timing is transmitted to the servo burst detector, which detects a servo pattern written in the servo sector from an output signal of the ADC 503 in the given servo detection timing. The detection result is transmitted to the servo controller interface 510 as a demodulated positional error signal (PES).

FIGS. 29A and 29B illustrate one example of an information writing order in the servo sector of the disk-shaped medium when the embodiment shown in FIG. 25 is applied. In the example shown in FIG. 29A, information applied to determine which demodulation method, i.e., which one of the burst gate patterns shown in FIGS. 24B and 24D respectively is to apply, i.e., in this case, the sector number and the track number, are disposed at a position such that they may be read earlier than the positioning information, i.e., the burst patterns A through D.

Further, FIG. 29B shows an example in which the information to determine the demodulation method to apply is included in another sector. Specifically, in the figure, in an immediately preceding servo sector, the corresponding information, i.e., information for obtaining the sector number and the track number, i.e., the sector code and the track code, are written. That is, in this example, the 'demodulation mode to apply' obtained from reading the information of the servo sector is applied to demodulate the servo sector to be read subsequently. This method is especially advantageous for a case where a time required for determining the demodulation method to apply as a result of reading the information is so long that timing to read the positional information within the sector may be missed.

Figure 30A:
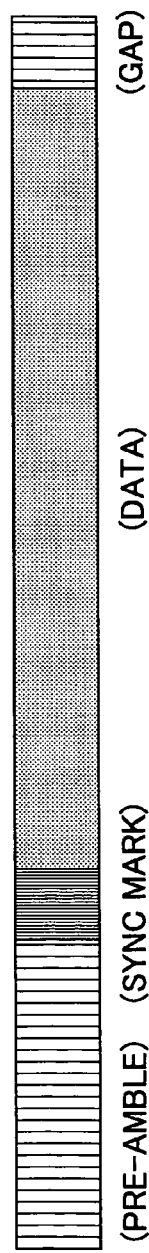
FIGS. 30A and 30B illustrate a configuration example of a data sector and a track internal arrangement including data sectors and servo sectors.
Figure 30B:

FIGS. 30A and 30B show a common data sector format of a disk-shaped medium and an example of an arrangement of the data sectors and the servo sectors in one track. As shown, generally speaking, the servo sector is provided for a plurality of data sectors. The burst patterns of the servo sectors shown in FIG. 2 and so forth are expressed in an exaggerated manner for the purpose of description. That is, actual burst patterns of the servo sectors do not exist at such short intervals. Rather, as shown in FIG. 30B, the servo sectors exist in a scattered manner over the entirety of a track.

Figure 31A:
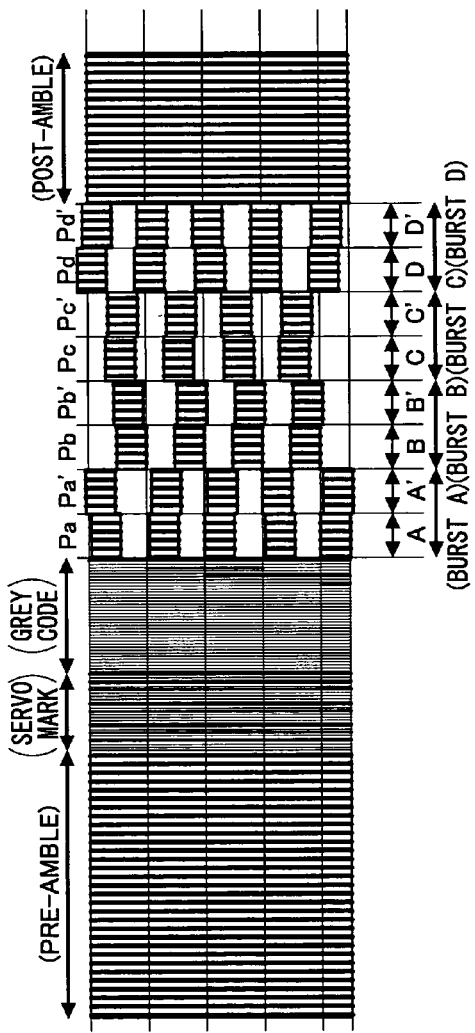
FIGS. 31A and 31B show examples of manners of servo track multiple writing according to one embodiment of the present invention when respective ones of the amplitude detecting method and the phase detecting method are applied.

FIG. 31A shows one example in which the positioning information, i.e., the above-mentioned servo patterns Pa, Pb and so forth, is written in the above-mentioned known amplitude detecting method. FIG. 32B shows one example in which the positioning information is written in the above-mentioned known phase detecting method. In both figures, a horizontal direction corresponds to a track circumferential direction, while a vertical direction corresponds to a radial direction of the disk-shaped medium. That is, in these figures, mutually adjacent four tracks are shown.

In the example of FIG. 31A, for example, burst patterns Pa, Pb, Pc and Pd as the positional information are written in a first rotation, and, in an alternate positional relationship thereto, burst patterns Pa', Pb', Pc' and Pd' are written in a second rotation. Details of a writing method applied are those described above with reference to FIGS. 4A, 4B, 5A and 5B.

Figure 31B:
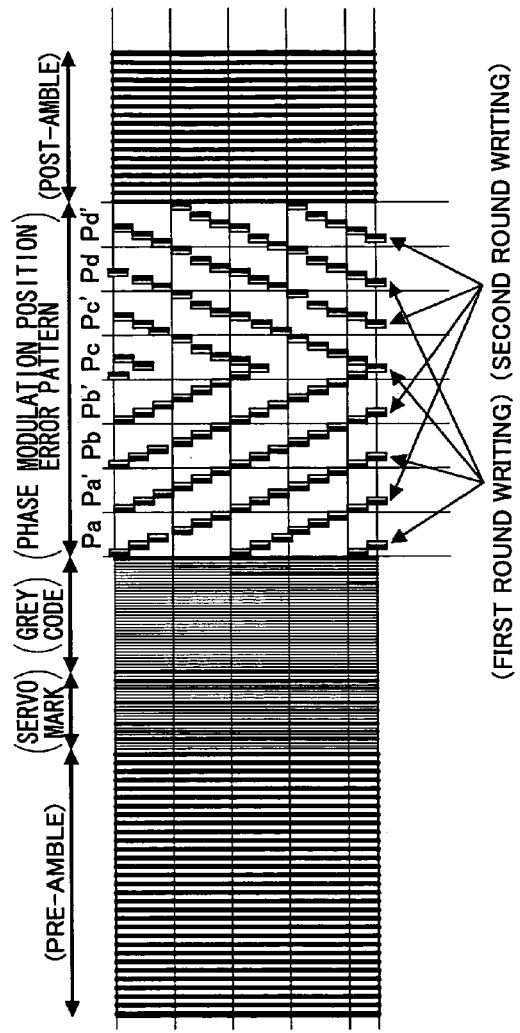

Also in the example of FIG. 31B, the same as the above, burst patterns Pa, Pb, Pc and Pd as the positional information are written in a first rotation, and, in an alternate positional relationship thereto, burst patterns Pa', Pb', Pc' and Pd' are written in a second rotation. However, this example is different from the amplitude detecting method of FIG. 31A, i.e., a method in which, as described with reference to FIGS. 11A through 11D and FIGS. 14A through 14C, a lateral positional error is detected from a change in a detected intensity, i.e., a detected amplitude, obtained from a lateral positional error between the reading head and the burst pattern. That is, in the phase detecting method, a lateral positional error is detected from an error of a total detected time, i.e., a change in a detected phase, occurring from a lateral positional error between the reading head and a sequence of burst pattern including the respective burst patterns Pa, Pb, Pc, Pd, . . . , for example. The present invention is applicable in the same manner to a servo control system employing either the amplitude detecting method of FIG. 31A or the phase detecting method of FIG. 31B.

Figure 32A:
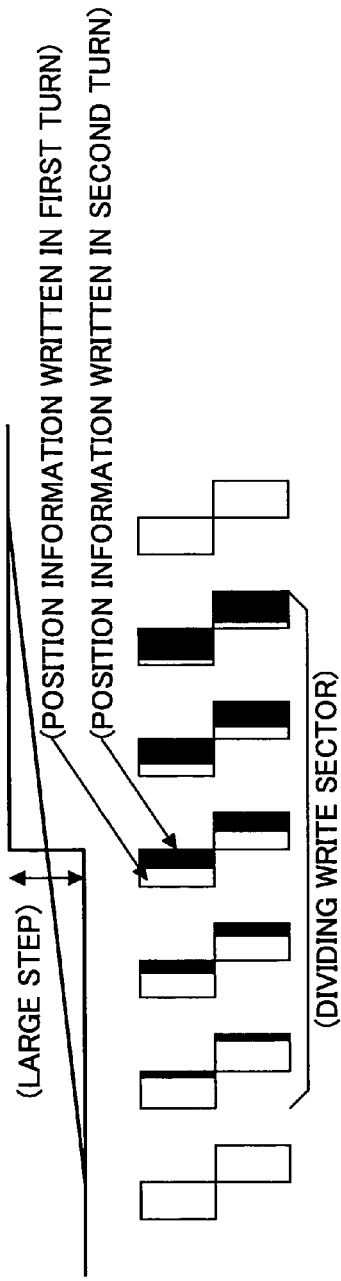
FIGS. 32A and 32B illustrate a servo track writing method according to further another embodiment of the present invention.
Figure 32B:
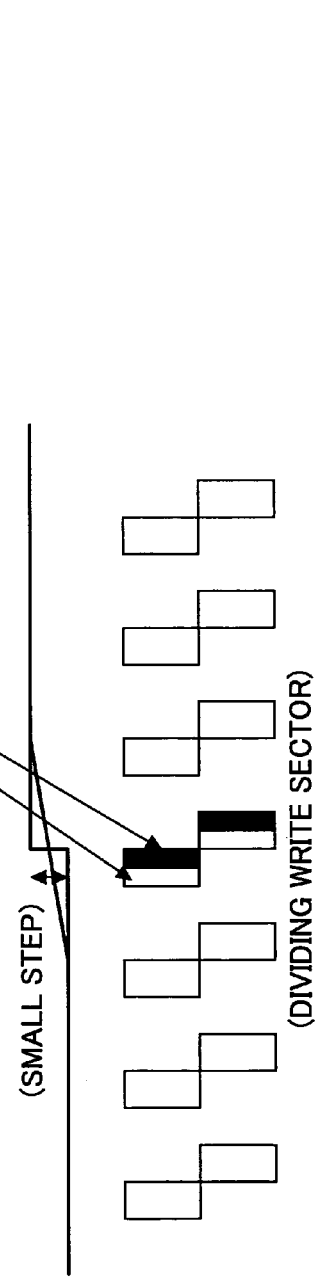

FIGS. 32A and 32B illustrate a variant of the embodiment described above with reference to FIGS. 6 through 10. That is, in this example, a method in which a length of the multiple writing part Δθ shown in these figures is increased/decreased according to a magnitude of a lateral positional error, i.e., a step, occurring from the above-mentioned asynchronous vibration (NRRO, non-repeatable runout) or such, is applied.

FIG. 32A shows a case where the step occurring due to NRRO between a first rotation and a second rotation is large, while, FIG. 32B shows a case where the step is small. As shown in FIG. 32A, when the step is large, the dividing write part, i.e., the above-mentioned overlapped writing part Δθ is set larger. In this example, mutually adjacent four servo sectors are applied. On the other hand, when the step is small as shown in FIG. 32B, the driving write part, i.e., the multiple writing part Δθ, is set smaller. In this example, a single servo sector is applied.

In this variant embodiment, the overlapped writing part is not uniformly determined, but is changed flexibly according to the magnitude of the step. Thus, overlapped writing need be applied only for a required length. As a result, an increase in a total time required for writing, occurring from applying the overlapped writing, can be minimized.

Thus, according to the present invention, a servo track writing method by which servo control upon recording/reproduction of a disk-shaped medium in which servo tracks are written can be smoothly carried out even when a writing positional error of the servo tracks occurs due to NRRO of a servo track writer or such, with a minimum required increase in a writing time, and a configuration of a disk drive by which recording/reproduction can be effectively carried out on the disk-shaped medium manufactured with thus undergoing such servo track writing, are provided.

The present invention is not limited to the above-mentioned embodiments, and order various embodiments can be derived from a scope of the claims.

What is claimed is:

1. A method for writing positioning information, in a plurality of generally round, consecutive tracks on a disk-shaped recording medium, the positioning information being used for positioning a head provided for writing information to the disk-shaped recording medium or reading information written in the disk-shaped recording medium, comprising:
    writing first positioning information on one track of the disk-shaped recording medium, and
    writing second positioning information on or adjacent to a portion of the track, the second positioning information overlapping the first positioning information in the track position to define an overlapping portion,
    wherein if the first and second positioning information are at least partially offset in the radial direction of the medium, the head is directed from the second positioning information to the first positioning information as the head reads the positioning information in the overlapping portion, and
    wherein a number of sectors that form said overlapping portion of one track of the positioning information is changed according to a magnitude of a stepped portion occurring at a starting point of the overlapping portion.

2. The method as claimed in claim 1, wherein:
    some of the positioning information written in the plurality of tracks comprises a combination of respective divisions written in respective ones of the plurality of tracks.

3. The method as claimed in claim 1, wherein:
    respective divisions, written in respective ones of the plurality of tracks, of said overlapping portion of the positioning information written in the plurality of tracks are written in such a manner that said first positioning information, which is to be read by the head after reading said second positioning information, is written in an earlier rotation than said second positioning information.

4. The method as claimed in claim 1, wherein:
    sectors forming said overlapping portion of the positioning information comprise mutually adjacent successive sectors.

5. The method as claimed in claim 1, wherein:
    sectors forming said overlapping portion of the positioning information comprise one or more sets comprising mutually adjacent successive sectors.

6. A method for writing positioning information, in a plurality of generally round, consecutive tracks on a disk-shaped recording medium, the positioning information being used for positioning a head provided for writing information to the disk-shaped recording medium or reading information written in the disk-shaped recording medium, comprising:
    writing first positioning information on one track of the disk-shaped recording medium, and
    writing second positioning information on or adjacent to a portion of the track, the second positioning information overlapping the first positioning information in the track position to define an overlapping portion,
    wherein if the first and second positioning information are at least partially offset in the radial direction of the medium, the head is directed from the second positioning information to the first positioning information as the head reads the positioning information in the overlapping portion, and
    wherein sectors forming said overlapping portion of the positioning information are such that each sector's length gradually increases in a writing start part of the path of said track, gradually decreases in a writing end part, and thus, a sum thereof is the same as a sector length of a part written in a single track without being divided.

7. A method of writing information to a disk-shaped recording medium or reading information written in the disk-shaped recording medium, with the use of positioning information previously written in the disk-shaped recording medium, comprising:
    applying a demodulation method for positioning a reproduction head with the use of the positioning information on the disk-shaped recording medium in which the positioning information of one track of the disk-shaped recording medium comprises, along a path of the one track, an overlapping part written in two places and a non-overlapping part written only in a single place, is common in the part written in the overlapping part and the part written only in the non-overlapping part, and
    wherein a number of sectors that form said parts written in the overlapping part of one track of the positioning information is changed according to a magnitude of a stepped portion occurring at a starting point of each overlapping part.

8. A method of writing information to a disk-shaped recording medium or reading information written in the disk-shaped recording medium, with the use of positioning information previously written in the disk-shaped recording medium, comprising:

applying a demodulation method, for positioning a reproduction head with the use of the positioning information on the disk-shaped recording medium in which the positioning information of one track of the disk-shaped recording medium comprises, along a path of the one track, an overlapping part written in two places and a non-overlapping part written only in a single place, is different in the overlapping part and the non-overlapping part, and wherein a number of sectors forming said part written in the overlapping portion of one track of the positioning information is changed according to a magnitude of a stepped portion occurring at a starting point of the overlapping portion.

9. The method as claimed in claim 8, wherein:

switching of said demodulation method being applied is made as a result of a predetermined servo pattern, previously written in such a manner that the overlapping part and the non-overlapping part may be distinguished, being read.

10. The method as claimed in claim 8, wherein:

switching of said demodulation method being applied is made as a result of predetermined information, previously written in a part of a track or sector code in such a manner that the overlapping part and the non-overlapping part may be distinguished, being read.

11. The method as claimed in claim 8, wherein:

switching of said demodulation method being applied is made as a result of the overlapping part and the non-overlapping part being distinguished with the use of previously written sector numbers.

12. A positioning information writing apparatus configured to previously write positioning information, in a disk-shaped recording medium, used for positioning a head provided for writing information to the disk-shaped recording medium or reading information written in the disk-shaped recording medium, wherein:

the positioning information for one track of the disk-shaped recording medium comprises, along a path of the one track, an overlapping part written in two places and a non-overlapping part written in only a single place, and wherein a number of sectors that form said overlapping part of the positioning information is changed according to a magnitude of a stepped portion occurring at a joint of the overlapping part of the positioning information.

13. The positioning information writing apparatus as claimed in claim 12, wherein:

said overlapping part comprises a combination of respective divisions written in respective places of the overlapping part.

14. The positioning information writing apparatus as claimed in claim 12, wherein:

respective divisions, written in respective overlapping parts, are written in such a manner that one to be read later by the head is written in an earlier written place.

15. The positioning information writing apparatus as claimed in claim 12, wherein:

sectors forming said overlapping part comprise mutually adjacent successive sectors.

16. The positioning information writing apparatus as claimed in claim 12, wherein:

sectors forming said overlapping part of the positioning information comprise one or more sets comprising mutually adjacent successive sectors.

17. A positioning information writing apparatus configured to previously write positioning information, in a disk-shaped recording medium, used for positioning a head provided for writing information to the disk-shaped recording medium or reading information written in the disk-shaped recording medium, wherein:

the positioning information for one track of the disk-shaped recording medium comprises, along a path of the one track, an overlapping part written in two places and a non-overlapping part written in only a single place, and wherein sectors forming said overlapping part of the positioning information are such that each sector's length gradually increases in a writing start part of the path of the first written place, gradually decreases in a writing end part, and thus, a sum thereof is the same as a sector length of the part written in the non-overlapping part.

18. An information recording/reproduction apparatus configured to write information to a disk-shaped recording medium or read information written in the disk-shaped recording medium, with the use of positioning information previously written in the disk-shaped recording medium, comprising:

a disk-shaped recording medium, a motor for rotating said disk-shaped recording medium, a reproduction head for reading/writing information to said disk-shaped recording medium, and a controller for controlling movement of said reproduction head via a demodulation method, wherein said demodulation method, which is applied for positioning a reproduction head with the use of the positioning information on the disk-shaped recording medium in which the positioning information of one track of the disk-shaped recording medium comprises, along a path of the one track, an overlapping part written in two places and a non-overlapping part written only in a single place, is common in the overlapping part and the non-overlapping part, and wherein a number of sectors that form said overlapping part of the positioning information is changed according to a magnitude of a stepped portion occurring at a joint of the overlapping part of the positioning information.

19. An information recording/reproduction apparatus configured to write information to a disk-shaped recording medium or read information written in the disk-shaped recording medium, with the use of positioning information previously written in the disk-shaped recording medium, comprising:

a disk-shaped recording medium, a motor for rotating said disk-shaped recording medium, a reproduction head for reading/writing information to said disk-shaped recording medium, and a controller for controlling movement of said reproduction head via a demodulation method, wherein said a demodulation method, applied for positioning a reproduction head with the use of the positioning information on the disk-shaped recording medium in which the positioning information of one track of the disk-shaped recording medium comprises, along a path of the one track, an overlapping part written in two places, and a non-overlapping part written in a single place, is different in the overlapping part and the non-overlapping part, and wherein a number of sectors that form said overlapping part of the positioning information is changed according to a magnitude of a stepped portion occurring at a joint of the overlapping part of the positioning information.

20. The information recording/reproduction apparatus as claimed in claim 19, wherein:
switching of said demodulation method being applied is made as a result of a predetermined servo pattern, previously written in such a manner that the overlapping part and the non-overlapping part may be distinguished, being read.

21. The information recording/reproduction apparatus as claimed in claim 9, wherein:
switching of said demodulation method being applied is made as a result of predetermined information, previously written in a part of a track or sector code in such a manner that the overlapping part and the non-overlapping part may be distinguished, being read.

22. The information recording/reproduction apparatus as claimed in claim 19, wherein:
switching of said demodulation method being applied is made as a result of the overlapping part and the non-overlapping part being distinguished with the use of previously written sector numbers.

* * * * *

UNITED STATES PATENT AND TRADEMARK OFFICE
CERTIFICATE OF CORRECTION

| | | |
|---|---|---|
| PATENT NO. | : 7,660,065 B2 | Page 1 of 1 |
| APPLICATION NO. | : 11/339684 | |
| DATED | : February 9, 2010 | |
| INVENTOR(S) | : Suzuki | |

It is certified that error appears in the above-identified patent and that said Letters Patent is hereby corrected as shown below:

In the Claims:

Claim 21, Col. 19, Line 9    Delete "in claim 9" and insert --in claim 19-- in its place.

Signed and Sealed this
Thirtieth Day of August, 2011

David J. Kappos
*Director of the United States Patent and Trademark Office*